United States Patent [19]
Sakamoto et al.

[11] Patent Number: 5,494,482
[45] Date of Patent: Feb. 27, 1996

[54] SCALLOP HANGER SETTING APPARATUS

[75] Inventors: Atsushi Sakamoto; Hiroshi Tanaka, both of Omiya, Japan

[73] Assignee: Mitsubishi Materials Corporation, Tokyo, Japan

[21] Appl. No.: 341,097

[22] Filed: Nov. 17, 1994

[30] Foreign Application Priority Data

| Dec. 1, 1993 | [JP] | Japan | 5-064471 U |
| Dec. 1, 1993 | [JP] | Japan | 5-064472 U |
| Dec. 1, 1993 | [JP] | Japan | 5-064473 U |
| Jul. 15, 1994 | [JP] | Japan | 6-164345 |

[51] Int. Cl.[6] ................................. A22C 25/10
[52] U.S. Cl. ............................. 452/185; 452/12
[58] Field of Search ....................... 452/185, 187, 452/12

[56] References Cited

U.S. PATENT DOCUMENTS

| 628,784 | 7/1899 | Fitzgerald | 452/187 |
| 1,248,843 | 12/1917 | Gay | 452/187 |
| 1,360,103 | 11/1920 | Faistenhammer | 452/187 |
| 1,596,333 | 8/1926 | Boyle | 452/187 |

FOREIGN PATENT DOCUMENTS 8511  7/1900  Norway ................. 452/161

*Primary Examiner*—Willis Little
*Attorney, Agent, or Firm*—Armstrong, Westerman, Hattori, McLeland & Naughton

[57] ABSTRACT

A scallop hanger setting apparatus according to the present invention contains a transport mechanism for transporting a pair of horizontally seated scallops, a perforating mechanism for perforating transported scallops' side-flanges and a culturing rope for through-holes, a threading mechanism for inserting a hanging wire member into the through-holes in the scallops and the culturing rope, a cutter mechanism for cutting the wire member to a predetermined length, a pressing mechanism for pressing both end portions of the cut wire member into deformation, and a driving mechanism for driving each of these mechanisms. The transport mechanism contains press levers for pressing scallops, and the press levers contain adjusting devices for adjusting press lever pressure imposed on scallops. A pair of scallops are arranged with one on the left-hand side and the other on the right-hand side of the rope, and one above and the other below the rope horizontally, and the hanging wire member connects two scallops's side-flanges and the culturing rope therebetween.

19 Claims, 31 Drawing Sheets

FIG.I

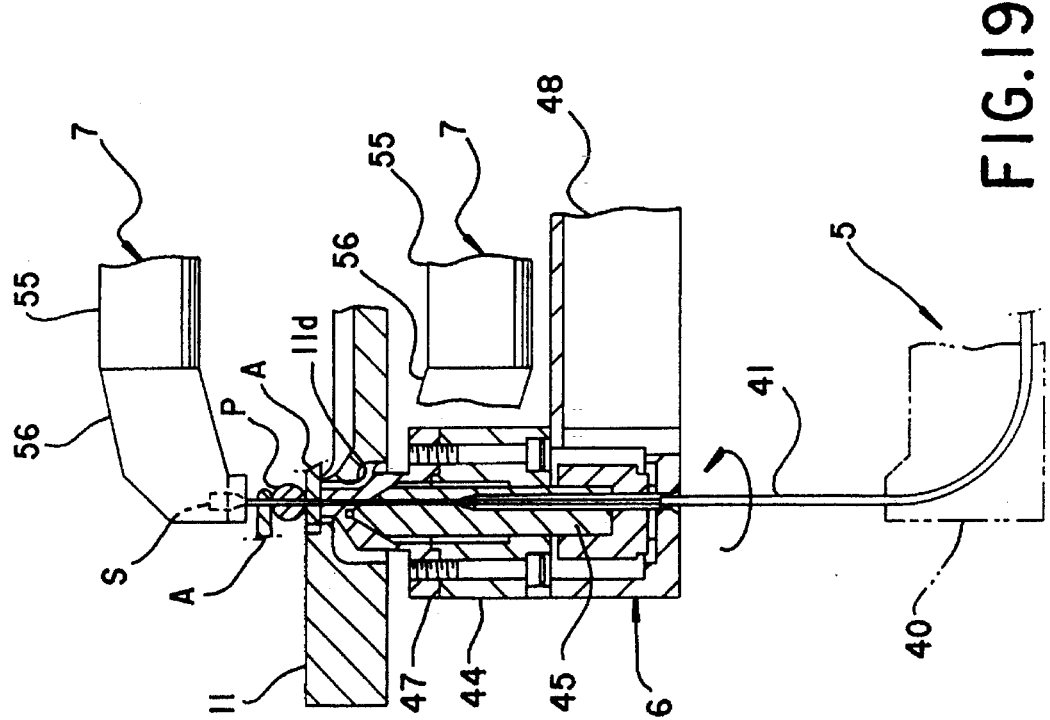
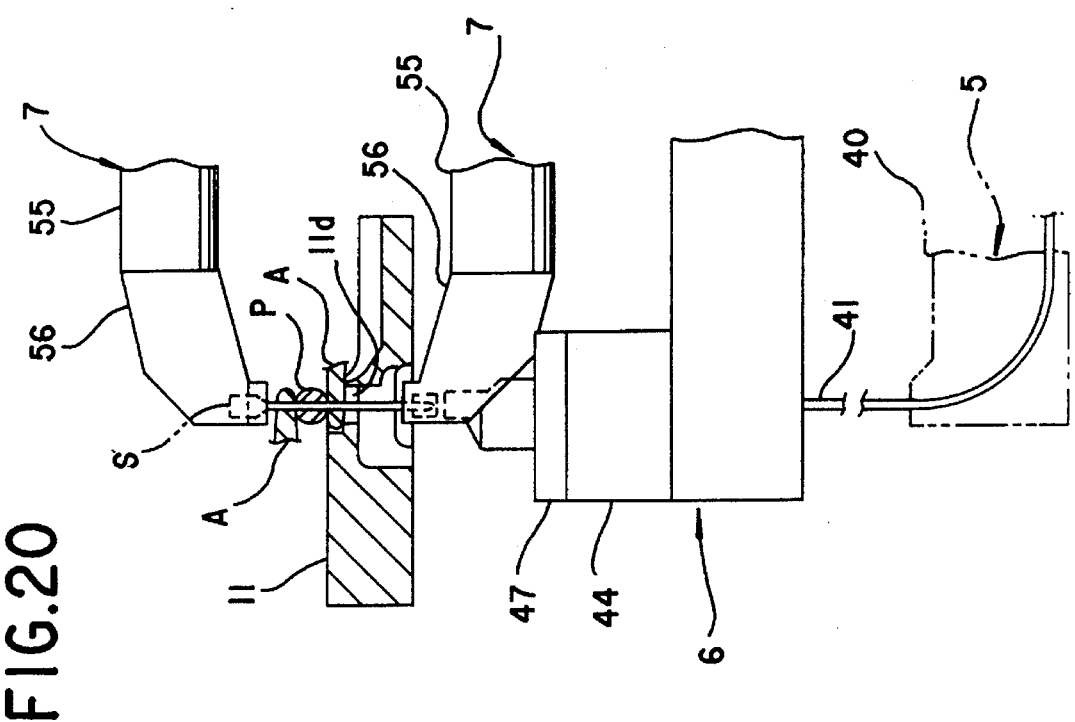

SCALLOP HANGER SETTING APPARATUS

BACKGROUND OF THE INVENTION

1. Field of the Invention

The present invention is directed to a scallop hanger setting apparatus, and, in particular, to a scallop hanger setting apparatus which is preferably used to hang young scallops onto a rope for culturing.

2. Description of the Related Art

A variety of scallop hanger setting apparatuses have been proposed. For example, in the line hanging apparatus disclosed in Japanese Patent Application Laid-open No. Sho-60-156337 and the scallop hanger setting apparatus disclosed in Japanese Patent Applications Laid-open No. Hei-3-24168 and No. Hei-3-32969, a scallop having its through-hole drilled in its one side-flange is set to each of a line that transversely pierces through a culturing rope, and then a knot is automatically formed at each end of the line. Thus, the scallop is prevented from coming off from the culturing rope.

In the hanger apparatus for culturing young scallops, disclosed in Japanese Patent Application Laid-open No. Hei-59-1836387, a scallop having its through-hole drilled in its one side-flange is set to each end of a line that transversely pierces through a culturing rope, and each end of the line is then heated so that it is deformed. The scallop is thus prevented from coming off from the culturing rope.

In the hanger apparatus for culturing young scallops, disclosed in Japanese Patent Application Laid-open No. Hei-58-149632, a scallop having its through-hole drilled in its one side-flange is set to each end of a line that transversely pierces through a culturing rope, and both ends of the line are then tied so that the line forms a loop. The scallop is thus prevented from coming off from the culturing rope.

Japanese Patent Application Laid-open No. Sho-58-75561 has proposed a method in which fixtures with projections pierce through a rope so that they are attached onto the rope at predetermined intervals along its direction of length. The fixtures are inserted through the holes of the scallop's shell side-flange to allow the scallop to be hung on the culturing rope.

In the scallop hanger setting apparatus disclosed in Japanese Patent Application Laid-open No. Sho-63-123326, young scallops are held in their upright position with their side-flanges down and a culturing rope is held onto the scallops' side-flanges to support the scallops with their axes aligned horizontally. In this setup, through holes are drilled through the side-flanges and the rope together using a drill that is guided by its drill guide to keep the drill from deflecting. A line is threaded through these through holes of the scallops and the culturing rope and both ends of the line are tied. The scallops are thus attached onto the culturing rope.

In the scallop side-flange piercing holding setting apparatus disclosed in Japanese Patent Laid-open No. Hei-2-262934, scallops are held in their upright position by a work table provided with a linear shallow groove. The table is also provided with a pair of pressure boards mounted vertically with each board on the opposing sides of the groove, each board having bristles like a brush, and a pair of bar members opened at a predetermined angle.

In the scallop hanger setting apparatus for culturing disclosed in Japanese Patent Application Laid-open No. Hei-2-273135, the tip of the drill bit that has drilled through holes on a scallop and a culturing rope is guided using positioning means so that the drill is aligned with the axis of a threading guide that allows a line to be threaded through the through holes. The drill and the threading guide are withdrawn in an integral action and the threading guide passes through holes, allowing a line to be threaded.

The conventional scallop hanger setting apparatuses quoted above perform the scallop hanging operation that was once manually done by workers. The above-quoted apparatuses, however, are unable to perform the scallop hanging operation in a quick and efficient manner.

Scallops that are hung by their side-flanges using the conventional hanger apparatuses are likely to wobble under underwater streams, causing themselves to bump against each other, allowing themselves to consume their energy by moving around themselves, and consequently slowing their own growth.

The scallop hanger setting apparatuses quoted above involve line tying or heat deformation to keep scallops on the rope, and thus it is difficult to perform efficiently the scallop hanging operation.

The scallop hanger setting apparatuses quoted above are incapable of holding scallops in a reliable manner during the hanging operation if scallops are out of size. Thus, the attempt to make a line pierce completely through the scallop's side-flange cannot always be fully achieved.

SUMMARY OF THE INVENTION

In view of the above problems, it is the object of the present invention to provide a scallop hanger setting apparatus which performs the scallop hanging operation in an efficient manner.

To achieve the above object, a scallop hanger setting apparatus is provided for piercing a wire member through a scallop's one side-flange to hang the scallop to the culturing rope, such that the wire member extends in a bar-like manner. The scallops are thus restricted from free movement, and prevented from bumping against each other and moving around in vain.

The scallop hanger setting apparatus is further characterized in that scallops with the culturing rope therebetween are pierced by the wire member with the rope sandwiched between the scallops by their side-flanges. The culturing rope touches the bodies of the scallop shells which substantially restricts the movement of the scallops.

A scallop hanging method in accordance with the present invention comprises the steps of perforating a through-hole in the scallop's one side-flange that is farther to the scallop's heart than the scallop's other side-flange and inserting a wire member into the through-hole to hang the scallop onto a culturing rope. Perforating operation is thus easily performed.

In another embodiment of the present invention, a scallop hanger setting apparatus is provided for inserting a wire member piercing a scallop's side-flange into a culturing rope to hang the scallop onto the culturing rope, wherein the scallop is positioned to the culturing rope by firmly holding one side-flange of the pair of side-flanges onto the culturing rope. The through-holes can be perforated through the scallops and the culturing rope with no displacement introduced in hole alignment, and furthermore the length of the wire member is reduced.

The scallop hanger setting apparatus is further characterized in that the scallop is positioned to the culturing rope by allowing the border on the scallop shell between its side-flange and its body shell to run roughly parallel to the culturing rope. This arrangement prevents the scallop shell body 10 from touching the culturing rope, and the positioning is performed with the side-flange firmly pressed onto the culturing rope.

The scallop setting apparatus can also be characterized in that the scallop is positioned to the culturing rope by firmly holding the scallop's one side-flange that is farther to the scallop's heart than the scallop's other side-flange onto the culturing rope. Adverse effect on the heart of the scallop is thus prevented.

In another embodiment of the present invention, a scallop hanger setting apparatus is provided for inserting a wire member piercing a scallop's one side-flange into a culturing rope to hang the scallop onto the culturing rope, wherein a pair of scallops are positioned to the culturing rope by arranging one scallop shell body on the left-hand side and the other scallop body on the right-hand side of the culturing rope when viewed from the axis of the through-hole in the culturing rope. Mutual physical contact between both scallops is avoided, and the side-flanges are thus firmly held onto the culturing rope.

The scallop hanger setting apparatus is characterized in that positioning means for positioning a pair of scallops onto the culturing rope comprises a first seating surface for seating one of the left-hand and right-hand scallops and a second seating surface for seating the other of the left-hand and right-hand scallops, a step is disposed between the first seating surface and the second seating surface, the scallop seated on the first seating surface is positioned such that the scallop's one side-flange comes on top of the culturing rope, and the scallop seated on the second seating surface is positioned such that the scallop's one side-flange comes beneath the culturing rope. Positioning work is thus easily done by placing one scallop's one side-flange on top of the culturing rope and the other scallop's one side-flange beneath the culturing rope.

In yet another embodiment of the present invention, a scallop hanger setting apparatus is provided for inserting a wire member piercing a scallop's one side-flange into a culturing rope to hang the scallop onto the culturing rope comprising: a first positioning member for positioning one side-flange of a first scallop to be placed on one side of the left-hand and right-hand sides of the rope, beneath the culturing rope so that the first positioning member abuts the first scallop's two sides defining the first scallop's one side-flange of a second scallop to be placed on the other side of the left-hand and the right-hand sides of the rope, on top of the culturing rope so that the second positioning member abuts the second scallop's two sides defining the second scallop's one side-flange. Both the first scallop and the second scallop are accurately positioned relative to the culturing rope longitudinally and transversely as well.

The scallop hanger setting apparatus is characterized in that said first positioning member and said second positioning member are arranged so that the culturing rope is sandwiched between said second scallop's one side-flange from above and said first scallop's one side-flange from below. This arrangement helps perforate through-holes through the first and second scallop side-flanges and the culturing rope in a good alignment.

The scallop hanger setting apparatus is further characterized in that said first and second scallops are placed onto said first positioning member to be transported. This allows the first positioning member and the scallop transport mechanism to be constructed as an integral assembly, and a simple-structured scallop hanger setting apparatus results.

The scallop hanger setting apparatus is also characterized in that said second positioning member can be raised or lowered relative to said first positioning member. This arrangement prevents the second positioning member from physically interfering with the second scallop when the second scallop positioned on the first positioning member is transported on the first positioning member.

Still further, the scallop hanger setting apparatus is characterized in that said scallop hanger setting apparatus comprises a scallop mounting table having a table surface running substantially flush with the seating surface of the first positioning member. This arrangement allows scallops put on the mounting table to easily slide toward the scallop seating surface of the first positioning member.

The present invention provides a method of hanging a scallop which comprises the step of positioning the scallop in such a manner that positioning members abut the scallop's two sides defining the scallop's one side flange that is farther to scallop's heart than the scallop's other side-flange. Positioning of the scallop is performed onto the culturing rope at a high accuracy longitudinally and transversely taking advantage of the nature of the scallop that the angle made by two sides defining a scallop's one side-flange that is farther to its heart is near 90 degrees, compared to the angle made by two sides defining the scallop's other side-flange that is near its heart.

In another embodiment of the present invention, a scallop hanger setting apparatus is provided for inserting a wire member piercing a scallop's one side-flange into a culturing rope to hang the scallop onto the culturing rope comprising: a perforating mechanism having a drill for perforating the scallops and the culturing rope for through-holes and a cylindrical drill guide circumferentially covering the drill for guiding so that the drill is radially deflected, and a threading mechanism for threading the wire member through the through-holes, whereby the drill guide starts holding the scallop's one side-flange onto the culturing rope before the drill starts perforating for the through-holes, and the drill guide is detached from the scallop's one side-flange after the threading mechanism completes the insertion of the wire member into the through-holes. No displacement in alignment takes place between the through-holes in the scallops' side-flanges and the through-hole in the culturing rope. The threading mechanism assuredly inserts the wire member into the through-holes.

A scallop hanger setting apparatus is also provided for inserting a wire member piercing a scallop's one side-flange onto a culturing rope to hang the scallop onto the culturing rope, whereby the axis of the guide hole in the guide member that guides the wire member toward the through-holes is offset from the axis of the drill that perforates the scallops and the culturing rope. Even if the wire member runs bent due to its residual curls when it is delivered out of the guide hole, the top end of the wire member will not be caught by the fringe area of the through-hole.

The present invention further provides a scallop hanger setting apparatus for inserting a wire member piercing a scallop's one side-flange into a culturing rope to hang the scallop onto the culturing rope, having: a cutter mechanism for allowing the wire member to be inserted into the guide hole that extends toward the through-holes which are perforated in the scallop and the culturing rope using the drill and for the wire member to a predetermined length, said cutter comprising a water feeder mechanism for feeding water into the guide hole and pushing water out of the opening of the guide hole open to the drill side, at least for the duration in which the drill operates. A fine debris that is generated when the drill perforates the scallops and the culturing rope P cannot intrude into the cutter mechanism via the guide hole.

The scallop hanger setting apparatus is characterized in that seawater is fed into the guide hole. Unlike in fresh water, the scallops are not debilitating.

A wire member for hanging a scallop pierces through the through-hole perforated in a scallop's one side-flange and inserted into a culturing rope to hang the scallop onto the culturing rope, characterized in that said wire member is stored, as wound around a reel, under moisture-free atmosphere using a desiccant until use. Thus, relatively constant curl is preserved during use.

The present invention provides a scallop hanger setting apparatus for inserting a wire member piercing a scallop's one side-flange into a culturing rope to hang the scallop onto the culturing rope, characterized in that said apparatus comprises a first plate on which a scallop is seated, a second plate which is rotatably supported by the first plate and which holds the scallop in cooperation with the first plate when the second plate comes close to the first plate, and a pair of guide members having therebetween the first plate and the second plate to set the second plate closer to the first plate, whereby said pair of guide members is provided with guide member separation setter means capable of adjusting the separation between the guide members. For a smaller scallop, the separation between the pair of guide members is narrowed to set the first plate closer to the second plate. For a larger scallop, the separation between the pair of guide members is widened to space the first and second plates more apart. Regardless of scallop size, therefore, scallops are held firmly between the first and second plates.

BRIEF DESCRIPTION OF THE DRAWINGS

A more complete understanding of the invention will be made by reference to the following drawings, in which:

FIG. 19 shows the state in which the upper portion of the thread is pressed.

FIG. 20 shows the state in which the lower portion of the thread is pressed.

DETAILED DESCRIPTION OF THE INVENTION

Figure 1:
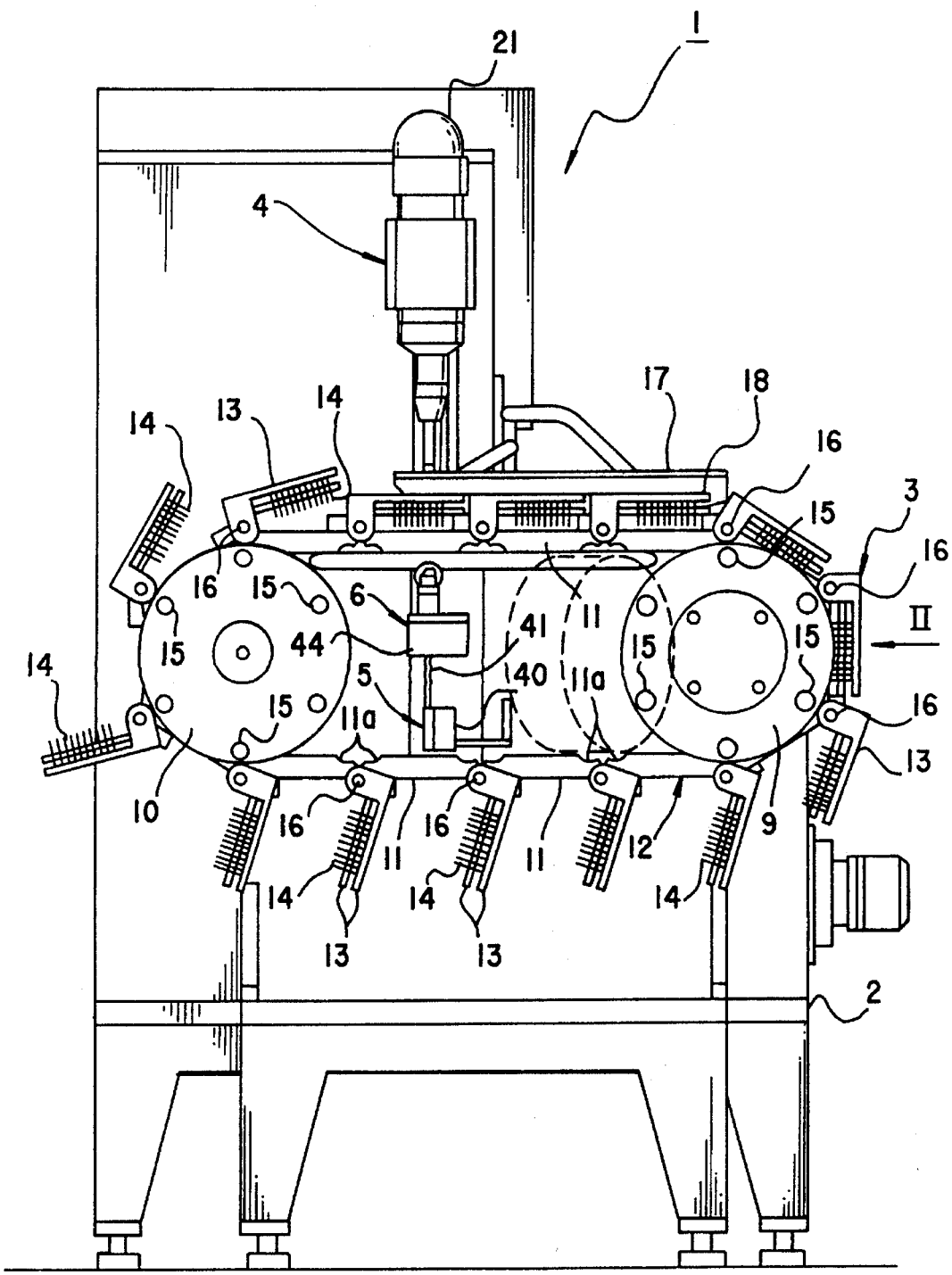
FIG. 1 is a front view showing the scallop hanger setting apparatus according to the present invention.
Figure 2:
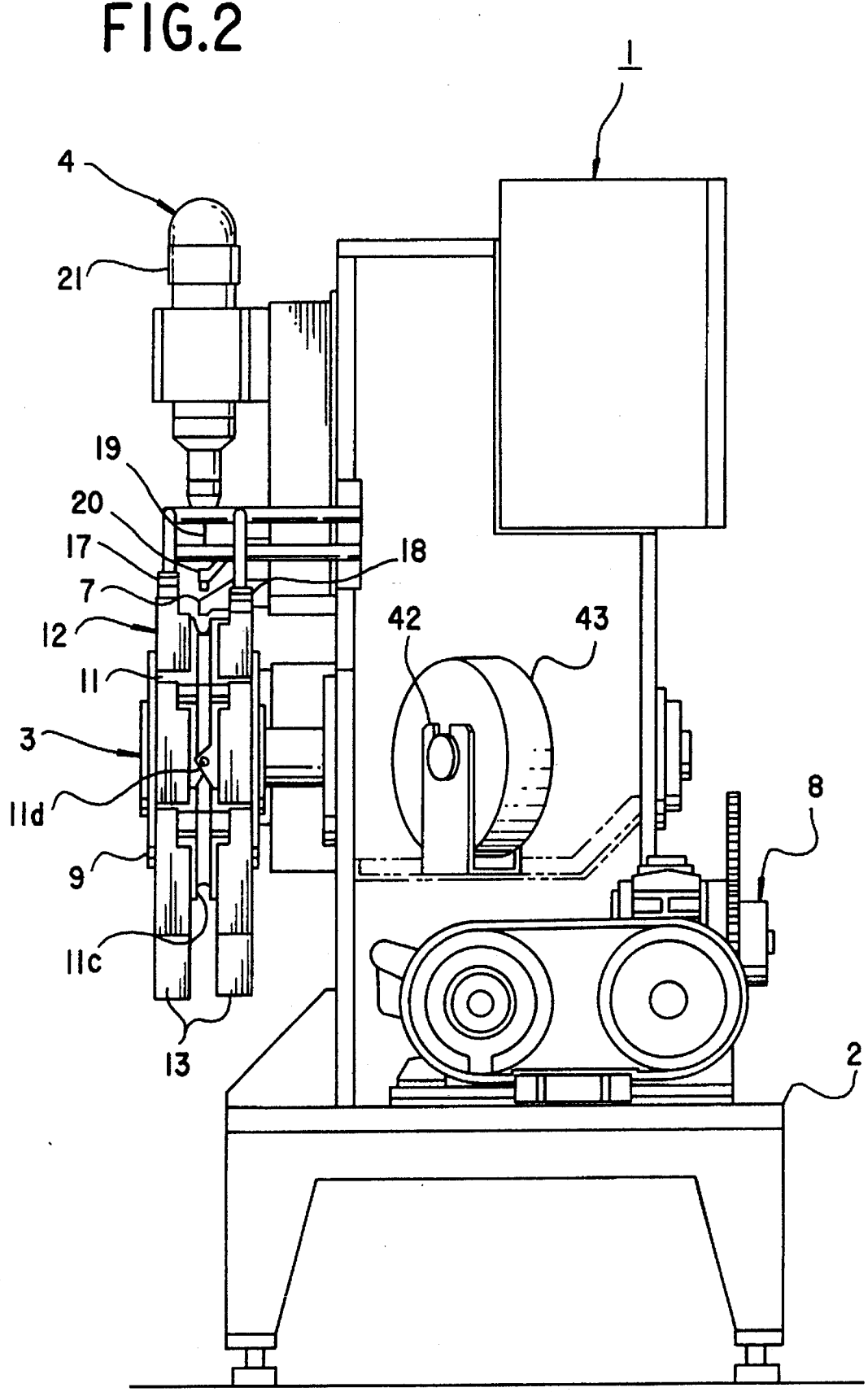
FIG. 2 is a right-hand side view showing the scallop hanger setting apparatus of FIG. 1.
Figure 3:
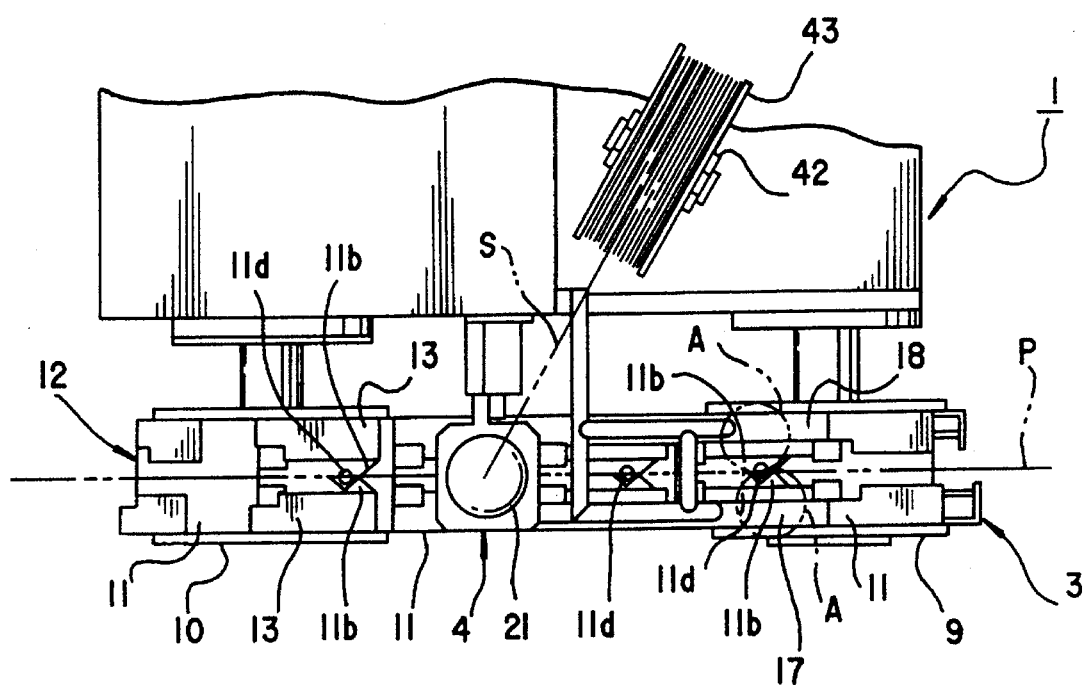
FIG. 3 is a plan view, with a portion omitted, showing the scallop hanger setting apparatus of FIG. 1.

Referring to FIG. 1 through FIG. 3, the apparatus according to a first embodiment of the present invention is discussed. Designated at 1 in these figures is a scallop hanger setting apparatus. The scallop hanger setting apparatus 1 comprises a mount 2, a transport mechanism 3 installed substantially horizontally onto the mount 2 for transporting scallop A in its horizontal position and for setting a culturing rope P against the scallop A shell side-flanges, a perforating mechanism 4 vertically movably supported near the transport mechanism 3 for perforating the side-flange of the scallop A and the culturing rope P, a threading mechanism 5 for threading with thread S the scallop A and the culturing rope P perforated by the perforating mechanism 4, a cutting mechanism 6 juxtaposed with the threading mechanism 5 for cutting the thread S to a predetermined length, a thread pressing mechanism 7 for pressing both end portions of the cut thread S to deform them so that the scallop A may not come off from the thread S, and a driving mechanism 8 for driving the above-mentioned mechanisms 3, 4, 5, 6 and 7.

Discussed next are the details of each of the mechanisms 3 through 7. The transport mechanism 3 comprises a pair of freely rotatable pulleys 9, 10 separated at a predetermined horizontal distance therebetween, a transport conveyer 12 wrapped around the pulleys 9, 10, made up of link plates 11 chained in an endless fashion on which the scallop A is placed in its horizontal position, press levers 13, rotatably supported at the outside portion of the forwardmost position of each link plate 11 in the direction of advance, for holding the scallops A between themselves and the link plates 11, and brush 14 of elastic material (such as nylon-6), provided on the surface of each press lever 13 that faces the corresponding link plate 11.

Figure 4:
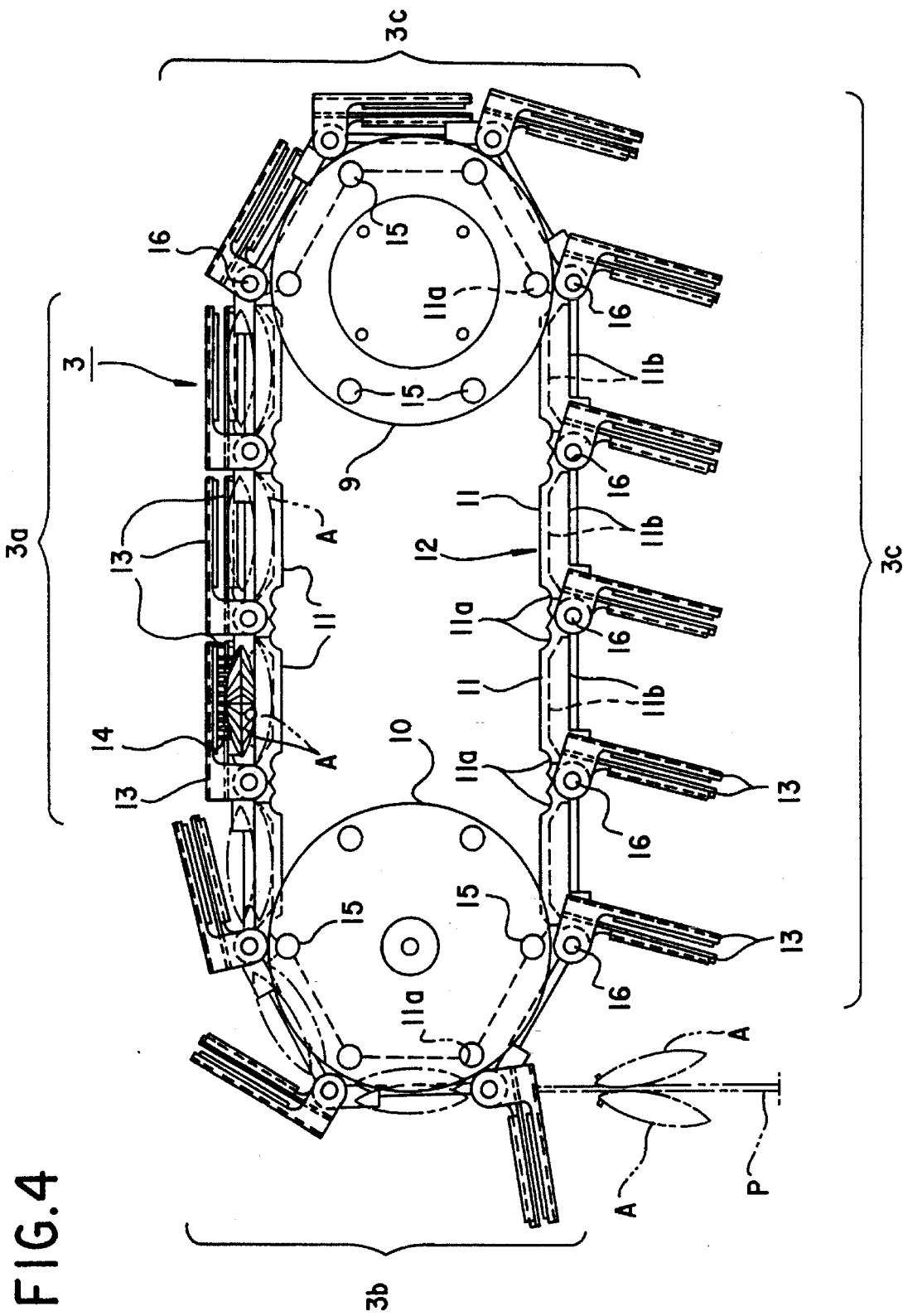
FIG. 4 is an enlarged front view showing a transport conveyer.

As shown in FIG. 1 and FIG. 4, the pulleys 9, 10 have catch pins 15 whose pitch therebetween is equal to the pitch of the link plate 11. When the link plates 11 are wrapped around as shown in FIG. 4, the catch pins 15 are engaged with the notches 11a formed on both side-flanges that extend vertically from the link plates 11 along the direction of length (the direction of advance). Link pins 16 connect the link plates 11 one with another at their forwardmost ends and rearmost ends in a manner that allows a relative rotation. The link pins 16 also rotatably support the press levers 13.

The link plates 11 are provided with transversely split tray portions 11b for positioning and holding the scallop A. As seen from the side view of the transport mechanism in FIG. 4, the tray portions 11b are formed so that a step is introduced between the outer side portion and the inner side portion of the transport conveyer 12 (along the axes of the pulleys 9, 10).

The transversely split tray portions 11b are connected in the transversely middle position of the link plates 11. Each tray portion 11b is open to the side so that the insertion and setting of the scallop A may be easily done from both sides of the conveyer 12.

The scallops A are inserted and placed into the tray portions 11b in a manner that one side-flange of the pair of side-flanges of the scallop A comes to the connection portion between both split portions 11b. As seen from the plan view in FIG. 3, the scallops A are placed in a manner with the connection portion being substantially a point of symmetry for placement.

A guide channel 11c runs on each link plate 11 along its direction of length in the middle position transversely across the link plate 11, passing by the connection portion of the tray portions 11b. The culturing rope P is routed through the guide channel 11c so that it comes to the side-flange of the scallop A placed on the tray portions 11b.

A through-hole 11d is provided in the connection portion of the link plate 11 where the side-flange of the scallop A is stacked on the culturing rope P, as shown in FIG. 3. This through-hole allows the thread S and the drill 19 of the perforating mechanism 4, both to be described later, to pass therethrough.

Like the tray portions 11b, the press levers 13 and the link pins 16 are also split into both side portions transversely across the link plates 11. Each scallop A is held between the link plate 11 and the press lever 13, by pressing the scallop A against the tray portion 11b of the link plate 11 using elasticity of the brush 14 installed on the inside surface of the press lever 13. In the transport mechanism 3 thus arranged as in FIG. 4, its transport portion 3a is constituted by its top linear portion between the pulleys 9 and 10, its delivery portion 3b is a vertical travel where the scallop A is released out of hold, and an idling portion 3c is the rest of the travel of the conveyer. A pair of guide plates 17, 18 are substantially horizontally disposed in touch with the inner surface of the transport portion 3a, with a predetermined distance allowed between the height levels of guide plates 17, 18. With the pulleys 9, 10 driven by the driving mechanism 8, the transport mechanism 3 advances the link plates 11 at their pitch at a time in a stepwise manner in the forward direction. When the press levers 13 that are introduced one after another to the transport portion 3a, the guide plate 18 causes each press lever 13 to rotate toward the link plate 11. Thus, the scallop A is kept held between the link plate 11 and the press lever 13. In the delivery portion 3b, each lever 13 rotates itself by its own gravity in a manner that the lever 13 is opened away from the link plate 11, thereby releasing the scallop A.

Discussed next is the perforating mechanism 4. As shown in FIG. 1 through FIG. 3, the perforating mechanism 4 is disposed above the transport portion 3a of the transport mechanism 3. The perforating mechanism 4 comprises the drill 19 for perforating the scallop A and the culturing rope P and a drill guide 20 disposed between the drill 19 and the transport mechanism 3. With the drill guide 20 held against the scallop A, the drill 19 is allowed pass therethrough.

The drill 19 is mounted on the electric motor 21 that is vertically movably supported by the mount 2 as shown in FIG. 1 and FIG. 2. Mounted onto the electric motor 21, the drill 19 comes just above the center of the orbit of the through-hole disposed on each link plate 11 of the transport mechanism 3. When the link plates 11 stop in the course of their stepwise advance, the drill 19 comes aligned with the through-hole 11d. Disposed between the electric motor 21 and the mount 2 is a raise/lower mechanism 22 which raises or lowers the electric motor 21 and the drill 19. As in FIG. 5 and FIG. 6, the raise/lower mechanism 22 comprises a motor stay 24 for supporting the electric motor 21, a guide rail 25 rigidly attached in its upright position onto the mount 2, for slidably supporting the motor stay 24, a cam follower 26 integrally mounted onto the motor stay 24, a cam roller 27 that is rotatably supported by the cam follower 26, and a cam which the cam roller 27 follows and rolls over.

The cam follower 26 is slidably engaged with a sub guide rail 29 that is mounted in parallel to the guide rail 25 onto the mount 2, in a manner that the direction of the cam follower 26 is restricted. Driven by the transport mechanism 8, the cam 28 raises and lowers the cam roller 27, reciprocating up and then down the electric motor 21, the motor stay 24 and the cam follower 26 in a predetermined stroke. The stroke is set long enough such that at its lower limit position the drill 19 completely perforates through a pair of scallops A and the culturing rope P therebetween (FIG. 5) and at its upper limit the drill 19 tip (the lowest end of the drill 19) completely clears the scallops A and the culturing rope P.

Figure 5:
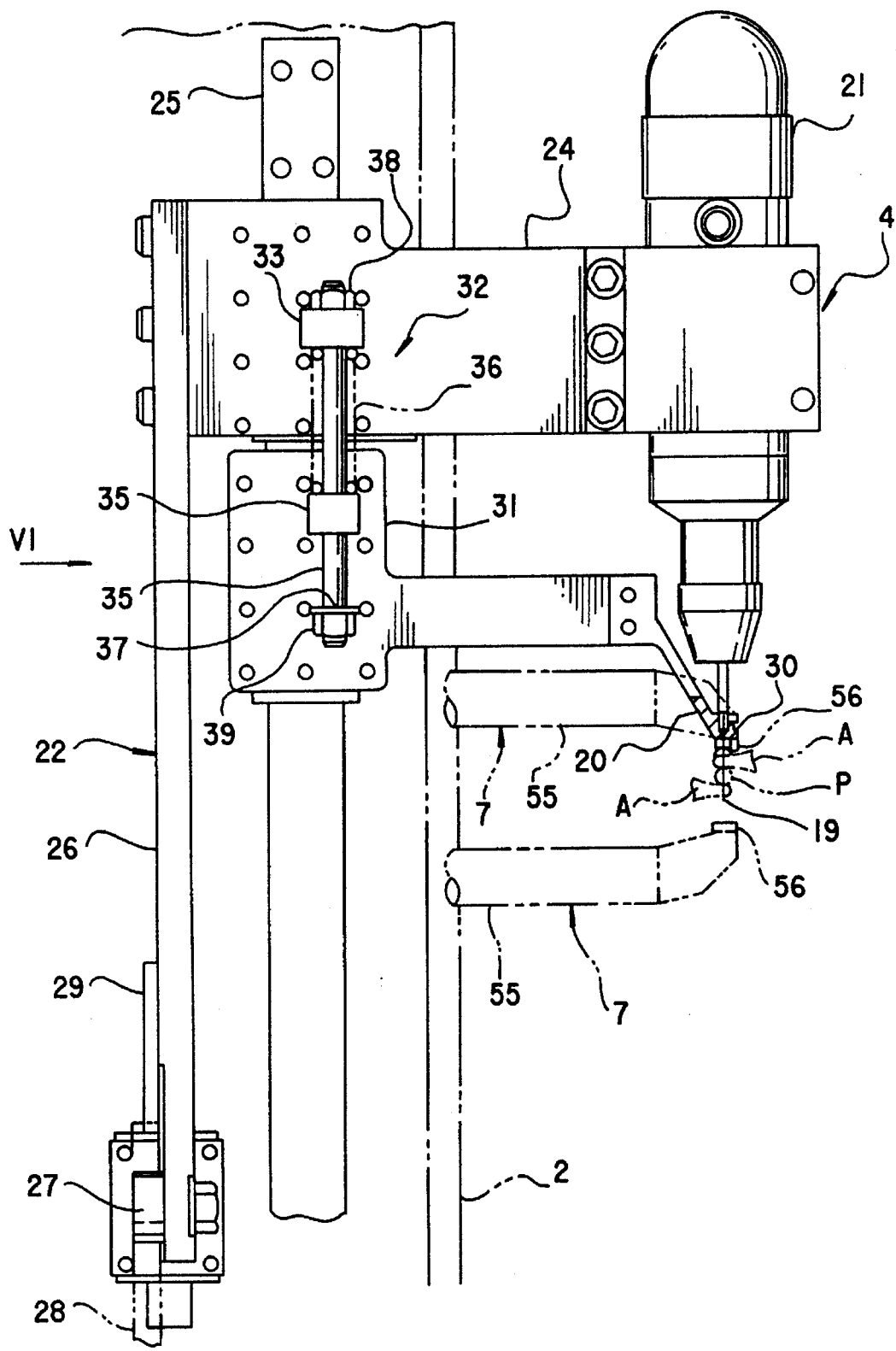
FIG. 5 is an enlarged side view showing a perforating mechanism.
Figure 6:
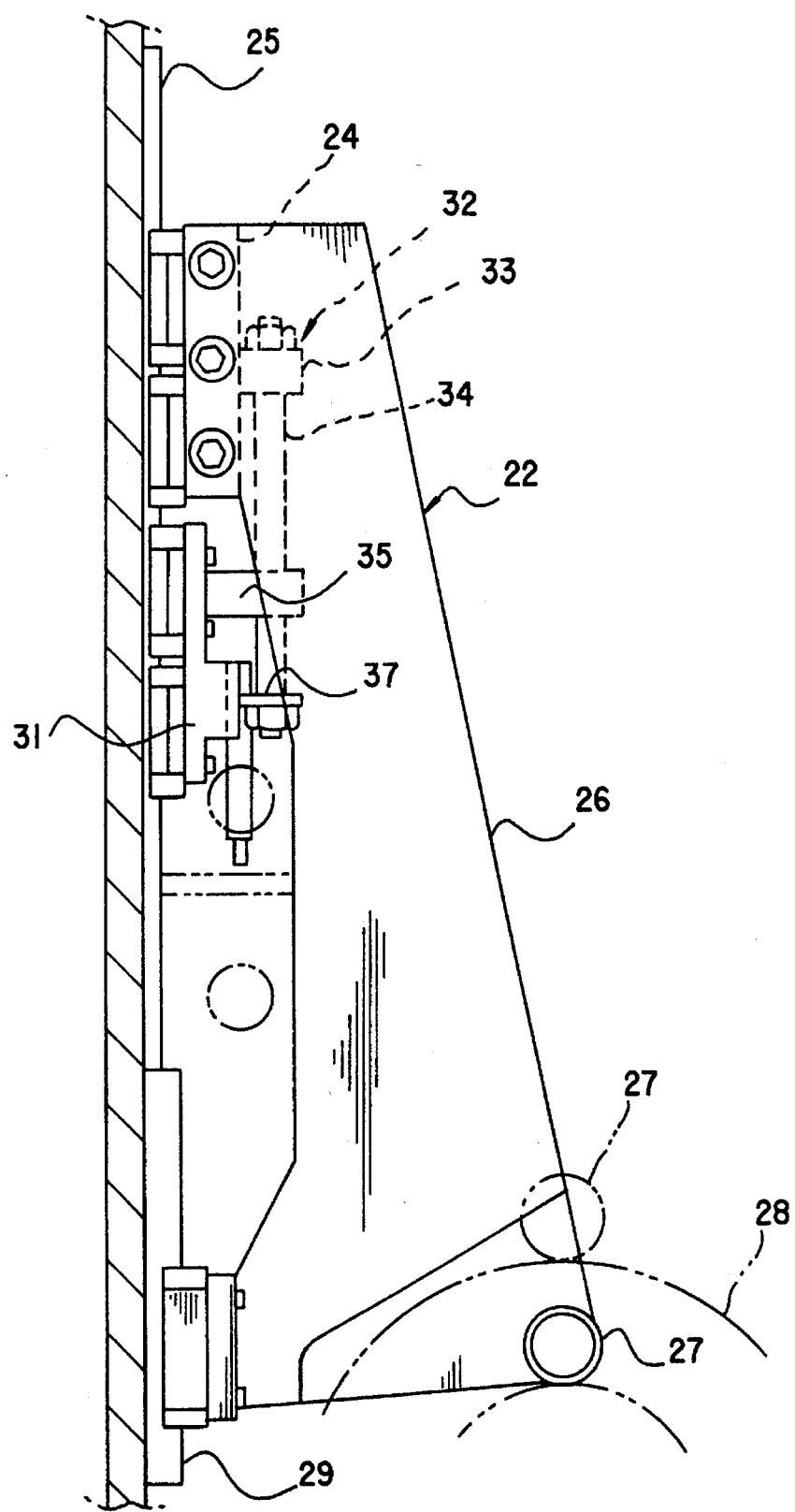
FIG. 6 is a view in the direction of the arrow VI in FIG. 5.

As shown in FIG. 5 and FIG. 6, the drill guide 20 comprises a guide pipe 30 which allows the drill 19 to pass as it is raised or lowered and a drill guide stay 31 to which the guide pipe 30 is rigidly mounted and which is slidably engaged with the guide rail 25. Like the drill 19, the drill guide 20 is raised and lowered along the guide rail 25. The stroke of the drill guide 20 is such that at its lower limit the drill guide 20 touches on the top surface of the scallop A, and such that at its upper limit the part of the thread pressing mechanism 7 to be described later is allowed between the drill guide 20 and the top surface of the scallop A. The drill guide 20 is linked with the drill 19 via a differential mechanism 32 so that both operate in coordination.

As shown in FIG. 5 and FIG. 6, the differential mechanism 32 comprises a bracket 33 rigidly attached onto the motor stay 24, a guide rod 34 extending from the bracket 33 downwardly and reaching the side of the drill guide stay 31, a bracket 35 rigidly attached onto the drill guide stay 31 and receiving slidably the guide rod 34, a compression spring 36 disposed between the bracket 35 and the bracket 33 attached onto the motor stay 24, a stop ring 37 attached to the guide rod 34 for stopping the guide rod 34 from coming off from the bracket 35 attached on the drill guide 31. The guide rod 34 is supported on one end at the bracket 33 by a nut 38, and the stop ring 37 is held on the other end of the guide rod 34 by means of a nut 38. The drill 19 and the drill guide 20 move integrally keeping a predetermined distance therebetween until the drill guide 20 reaches the scallop A. At the moment the drill guide 20 reaches the scallop A thereafter, the drill 19 only is continuously lowered against spring force exerted by the compression spring 36. In raising operation, the drill 19 clears first the scallop A and then the drill guide 20 clears the scallop A.

The threading mechanism 5 is now discussed together with the thread cutting mechanism 6. Both the thread mechanism 5 and the thread cutter mechanism 6 are disposed, with the cutter mechanism 6 above the threading mechanism 5, within the conveyer 12, in a manner that both mechanisms have substantially the same center axis as the perforating mechanism 4. The threading mechanism 5 comprises a feeder head 40 vertically reciprocated by the driving mechanism 8 and a guide pipe 41 mounted on the feeder head 40, the guide pipe 41 is curved where its horizontal portion is connected to its vertical portion. The horizontal portion extends near the drum 43 which is rotatably supported by a bracket 42 attached onto the mount 2 and which the thread S is wound around as shown in FIG. 2 and FIG. 3. The thread S paid out from the drum 43 is routed out the mount 2 and then fed to the cutter mechanism 6 via the vertical portion of the guide pipe 41.

Since the thread is a nylon line in this embodiment, increased flexural stiffness results. The thread S can be easily routed through the holes of the scallops A and the culturing rope A perforated by the perforating mechanism 4. A line fabricated of polyester or other material may be perfectly acceptable as the thread S if it offers a sufficient flexural stiffness.

As the feeder head 40 is moved to the cutter mechanism 6, the vertical portion of the guide pipe 41 is inserted into the cutter mechanism 6 from below. Therefore, a length of the thread S corresponding to the movement is fed into the cutter mechanism 6. The feeding operation of the thread S is aided by frictional resistance taking place between the curved portion of the guiding pipe 41 and a high flexural stiffness thread S.

Figure 7:
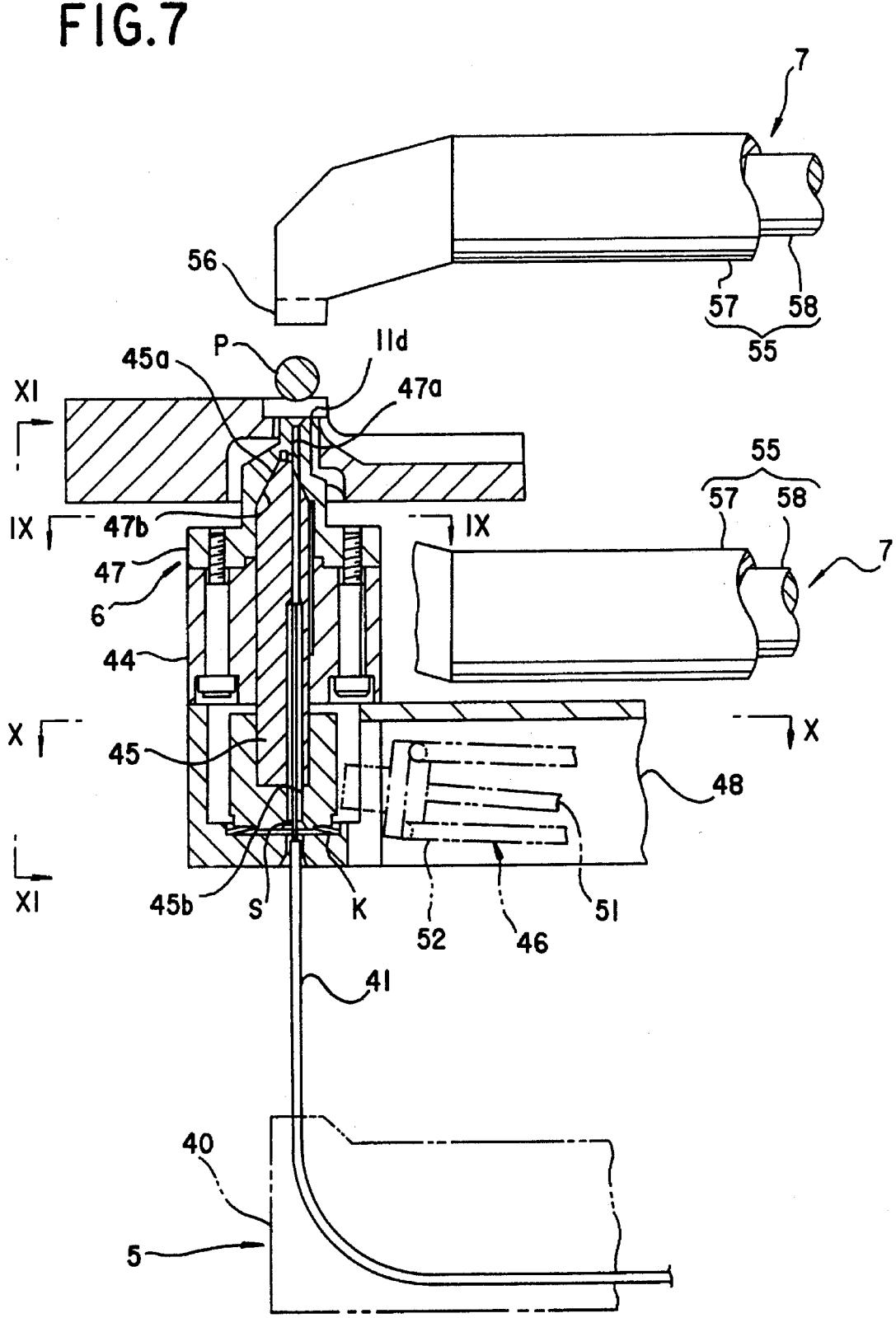
FIG. 7 is a vertical cross-sectional side view showing a threading mechanism and a cutter mechanism.
Figure 9:
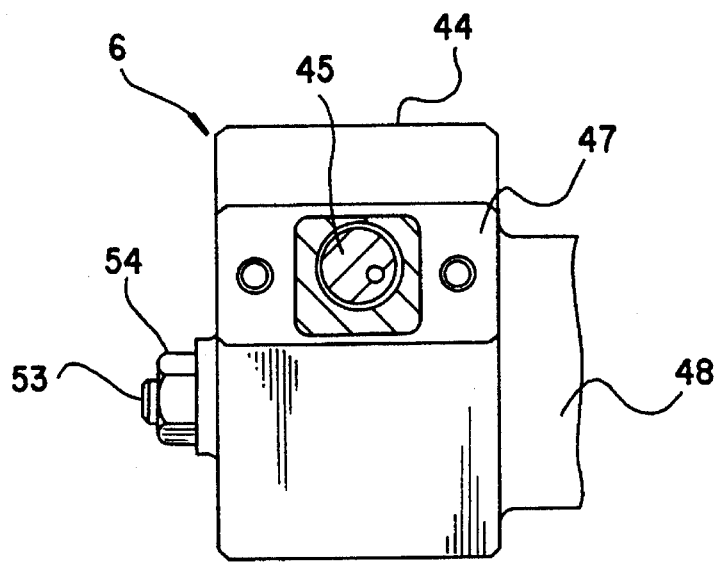
FIG. 9 is a cross-sectional view taken along line IX—IX in FIG. 7.

The cutter mechanism 6 comprises a head casing 44 which is, independent of the threading mechanism 5, vertically reciprocated in a predetermined stroke by the driving mechanism 8, a cutter 45 disposed in the head casing 44 in a manner that the cutter 45 is rotatably supported around its own axis vertically oriented, and oscillating means 46 for rotating clockwise and then counterclockwise in a repeated manner within a predetermined angle. As shown in FIG. 7 and FIG. 9, the head casing 44 has a lid 47 which is provided with a through-hole 47a that is aligned with the axis of the drill 19. The lid 47 has a female tapered conical inner surface 47b that communicates with the above through-hole 47a as shown in FIG. 7. The through-hole 47a is radially offset from the apex of the tapered conical inner surface 47b.

The cutter 45 is of a cylindrical form, and housed inside the head casing 44 with its axis of rotation aligned with the apex of the female tapered conical surface 47b. The cutter 45 has at its top end a male tapered conical surface 45a that is in a slidable engagement within the female tapered conical surface 47b of the lid 47. Also, the cutter 45 has a guide hole 45b in a radially offset position from its axis of rotation, and the rotation of the cutter causes the guide hole 45b to communicate with the through-hole 47a on the lid 47. A disk spring K disposed between the bottom of the cutter 45 and the head casing 44 always urges the cutter toward the lid 47. At the interface between the male tapered conical surface 45a of the cutter 45 and the female tapered conical surface 47b of the lid 47, the edge of the through-hole 47a and the edge of the guide hole 45b cut at a slant surface the thread S that is routed through the hole 47a and the guide hole 45b (see FIG. 7).

Since the cutter mechanism 6 cuts the thread S in a manner that its cut surface is of a longitudinally sharp form, the thread S is easily routed through the holes of the scallops A and the culturing rope A provided by the perforating mechanism 4.

Figure 10:
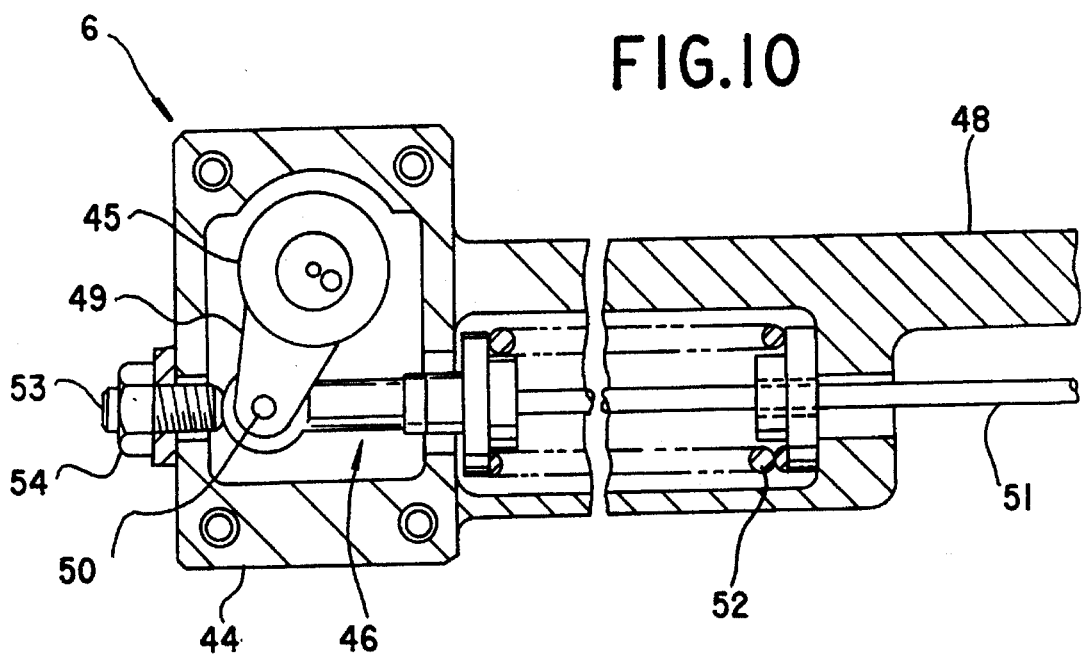
FIG. 10 is a cross-sectional view taken along line X—X in FIG. 7.

The oscillating means 46 connected to the cutter 45 extends from the head casing 44 into the interior of the mount 2, and is housed inside a raise/lower hollow arm 48 that is connected to the driving mechanism 8. As shown in FIG. 10, the oscillating means 46 comprises a pull rod 51 that is connected via a spherical joint 50 to a link 49 that radially extends from the bottom end of the cutter 45, a return spring 52 that urges continuously the pull rod 51 to oscillate or rotate the cutter 45 so that the guide hole 45b of the cutter 45 is aligned with the through-hole 47a of the head casing 44, and an unshown link mechanism that is driven by the driving mechanism 8 to cut the thread S by offsetting the guide hole 45b from the through-hole 47a through reversing the previous rotation of the cutter 45.

Figure 8:
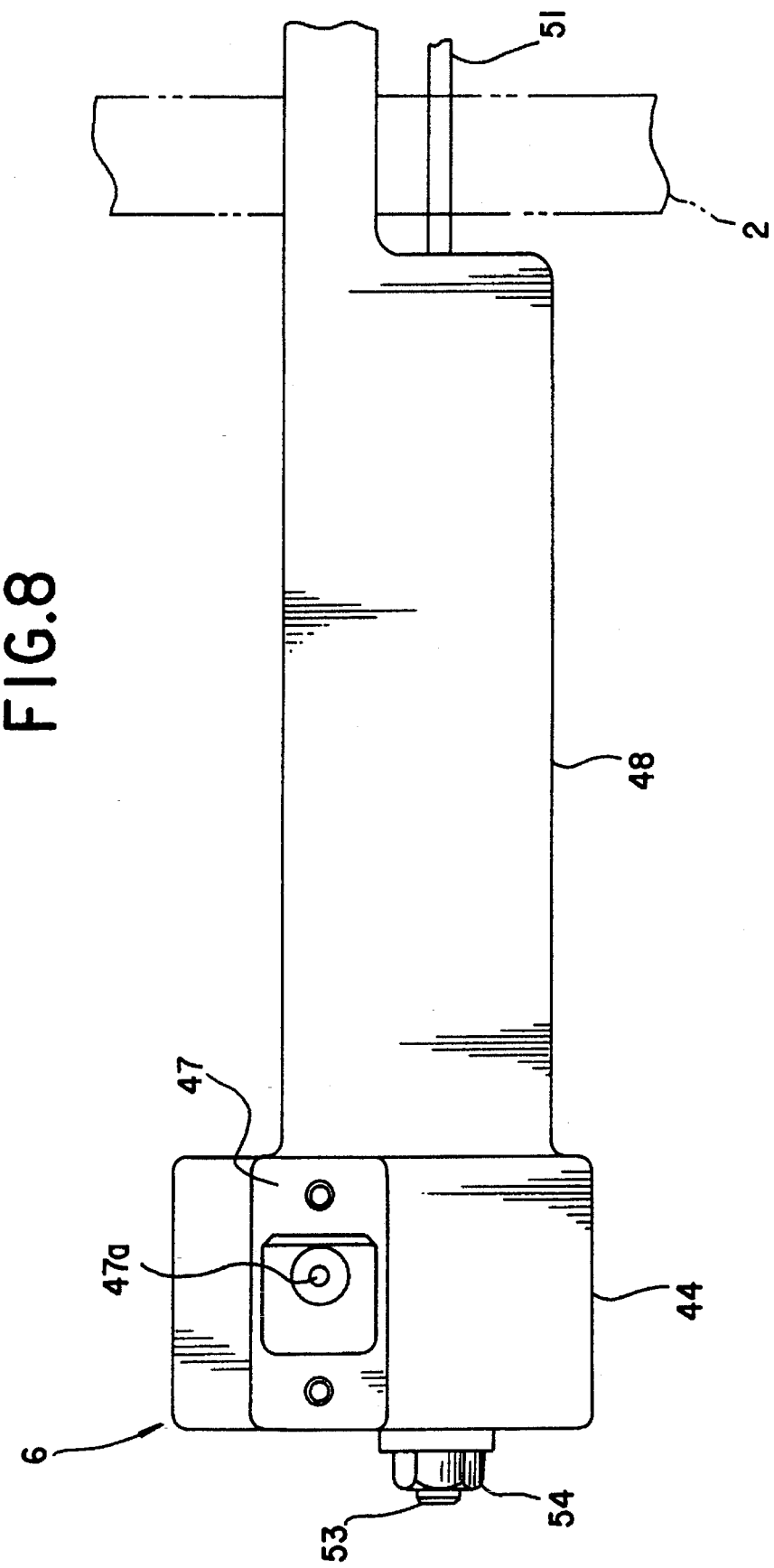
FIG. 8 is a side view showing the threading mechanism.

A bolt 53 is screwed into the side wall of the head casing 44 as shown in FIG. 8 through FIG. 10, and the bolt 53 is secured to the wall of the head casing 44. The bolt 53 is projected into the interior of the head casing 44 as shown in FIG. 10, and abuts one end of the pull rod 51. By adjusting the bolt 53 with respect to the head casing 44, that is, by adjusting the stop position of the pull rod 51 against force of the return spring 52, the initial position of the cutter 45 is adjusted. Namely, the bolt 53 is provided to adjust alignment of the guide hole 45b and the through-hole 47a.

The cutter mechanism 6 is vertically reciprocated in a predetermined stroke by the driving mechanism 8. The stroke is determined by the upper limit where the top of the cutter mechanism 6 is inserted into the through-hole 11d disposed on each link plate 11 of the transport mechanism 3 and the lower limit where the cutter mechanism 6 is lowered sufficient enough to make available space above the cutter mechanism 6 for the thread pressing mechanism to enter there.

Discussed next is the thread pressing mechanism 7. As shown in FIG. 5, the thread pressing mechanism 7 extends from the mount 2 toward the transport mechanism 3, and is composed of a pair of upper and lower mechanisms. Since the pair are substantially the same, the lower thread pressing mechanism 7 is detailed herein. As seen from FIG. 5 and FIG. 7, the lower thread pressing mechanism 7 comprises a driving shaft 55 extending from the mount 2 toward the transport mechanism 3, and a pair of press teeth 56 opened or closed by the driving shaft 55 (see FIG. 11 and FIG. 12).

Figure 11:
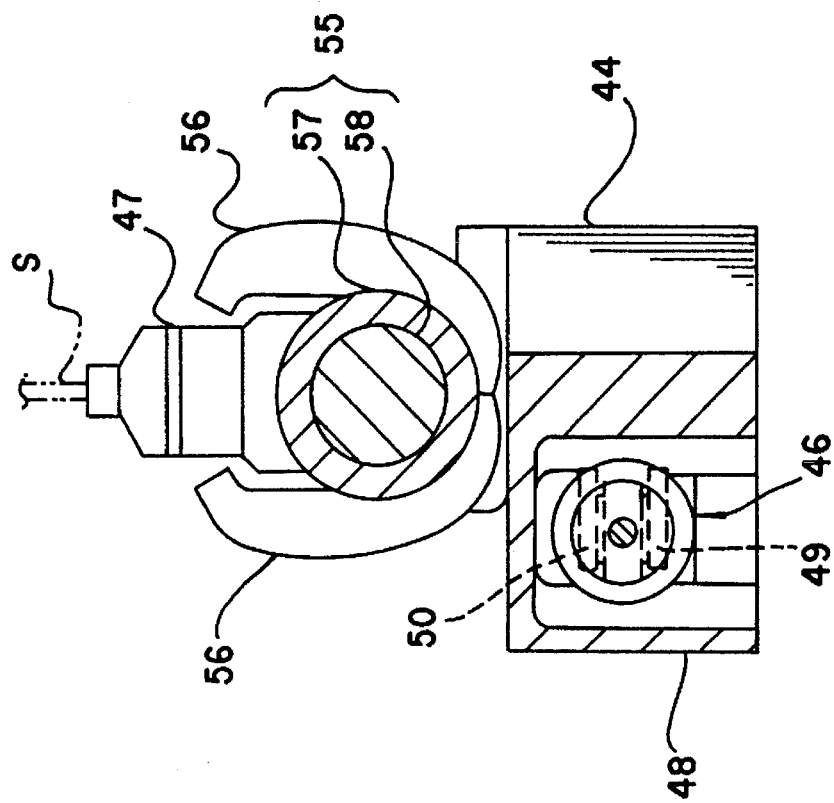
FIG. 11 is across-sectional view taken along line XI—XI in FIG. 7.
Figure 12:
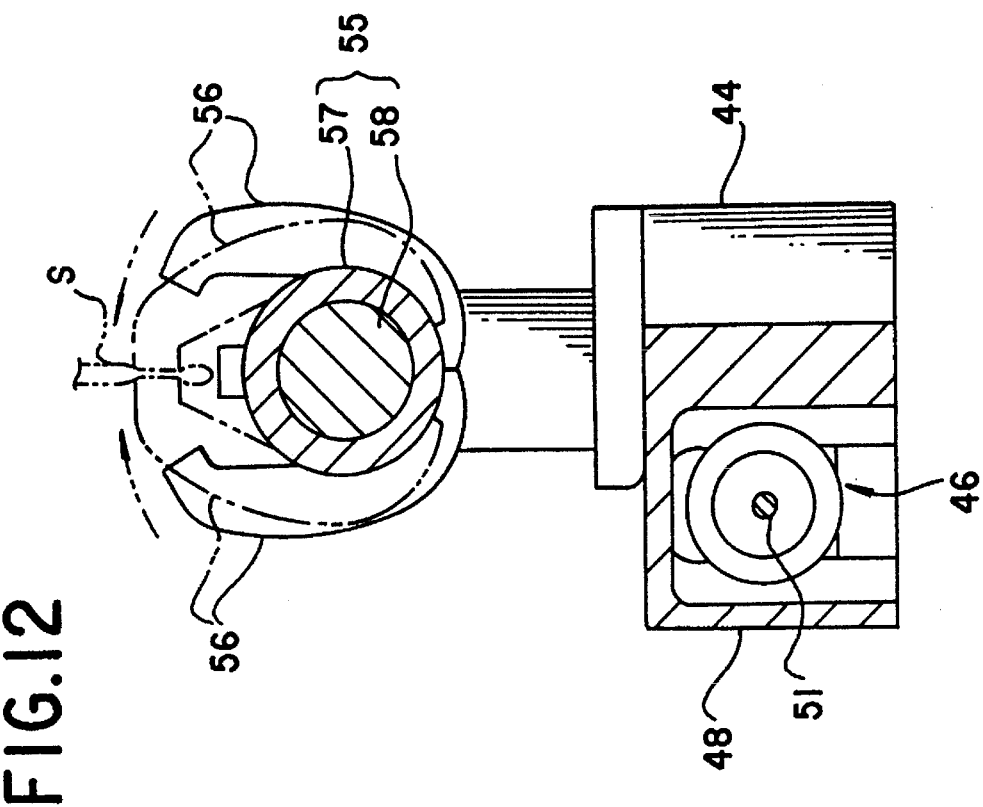
FIG. 12 is a cross-sectional view showing the state in which the bottom portion of a thread is pressed to be flat.

The driving shaft 55 comprises a hollow outer shaft 57 and a solid inner shaft 58 that is in relatively rotatable engagement within the hollow outer shaft 57 as shown in FIG. 7, FIG. 11 and FIG. 12. Each of the press teeth 56 is integrally connected to respective ends of the outer and inner shafts 57, 58 such that the teeth 56 tangentially extend from respective circumferences of the shafts 57, 58.

The upper and lower press teeth 56 run in opposite directions. The press teeth 56 are formed as above so that the thread S is pressed the nearest possible to the scallop A to shorten the thread S tied, and so that the teeth 56 do not physically interfere with the way of the components of the cutter mechanism 6, the perforating mechanism 4 and the like.

The other ends of the shafts 57, 58 are connected within the mount 2 to unshown respective link mechanism, which are driven by the driving mechanism 8. These link mechanisms rotate the shafts 57, 58 relatively in opposite directions around their axes, closing the press teeth 56 as shown in the dotted lines in FIG. 12, causing the teeth tips to be in pressing engagement, and thus pressing the thread S between the teeth 56 to flatten it from the sides. The upper pressing teeth 56 are then open wide to each other so that the space is made available for the cutter mechanism 6 to be raised as shown in FIG. 11.

On the other hand, the upper thread pressing mechanism 7 opens its teeth 56 tips wide to make available space for the drill 19 and the guide pipe 30 of the perforating mechanism 4 to be lowered as illustrated in FIG. 5. The operations of the thread pressing mechanism 7 are properly timed so that the pressing steps of the thread S by the teeth 56 are performed, respectively, after the perforating mechanism 4 is raised and after the cutter mechanism 6 is lowered.

The threading mechanism 5 is raised by a raise/lower mechanism 60.

Figure 13:
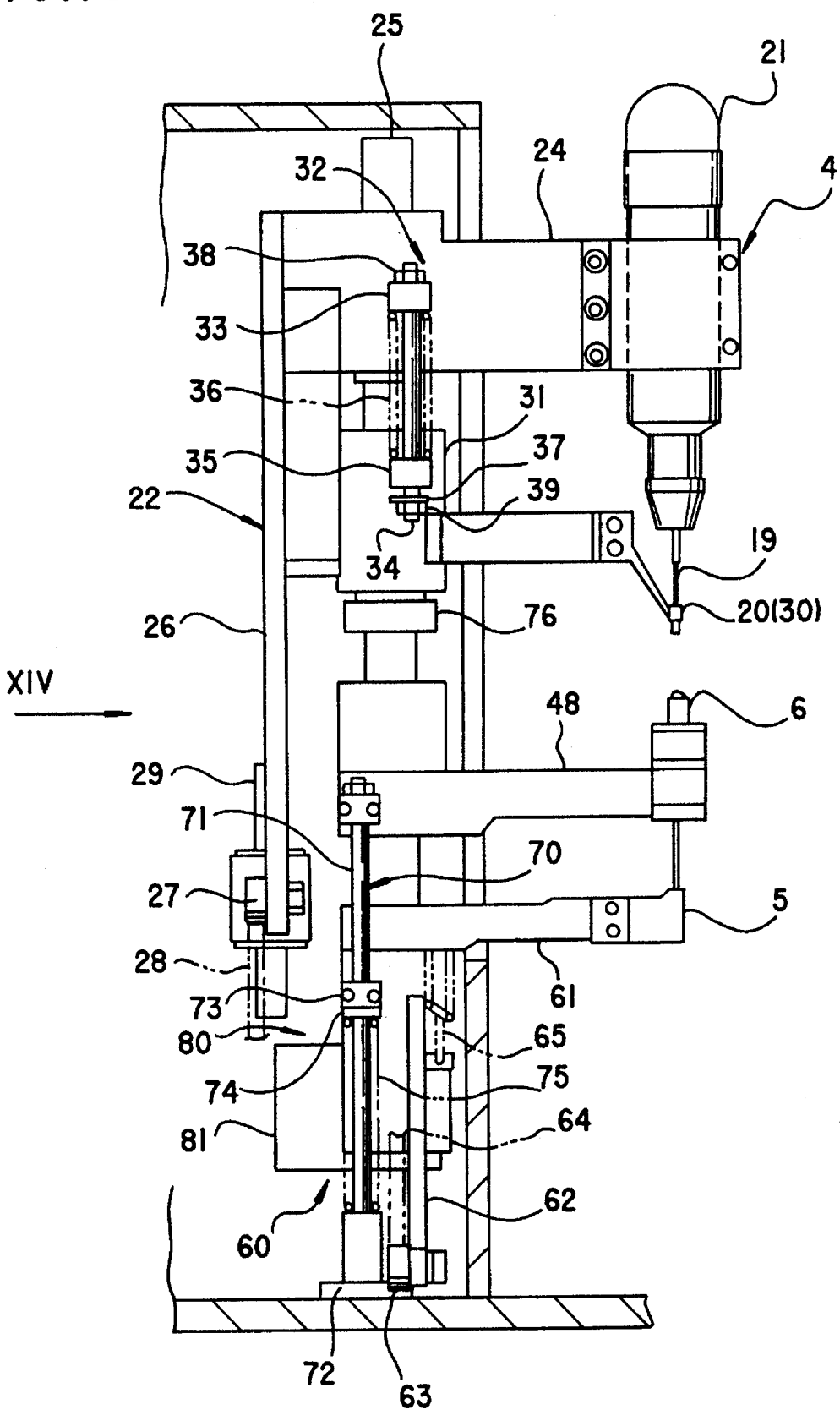
FIG. 13 is a side view showing the state in which the perforating mechanism is at its upper limit position.
Figure 14:
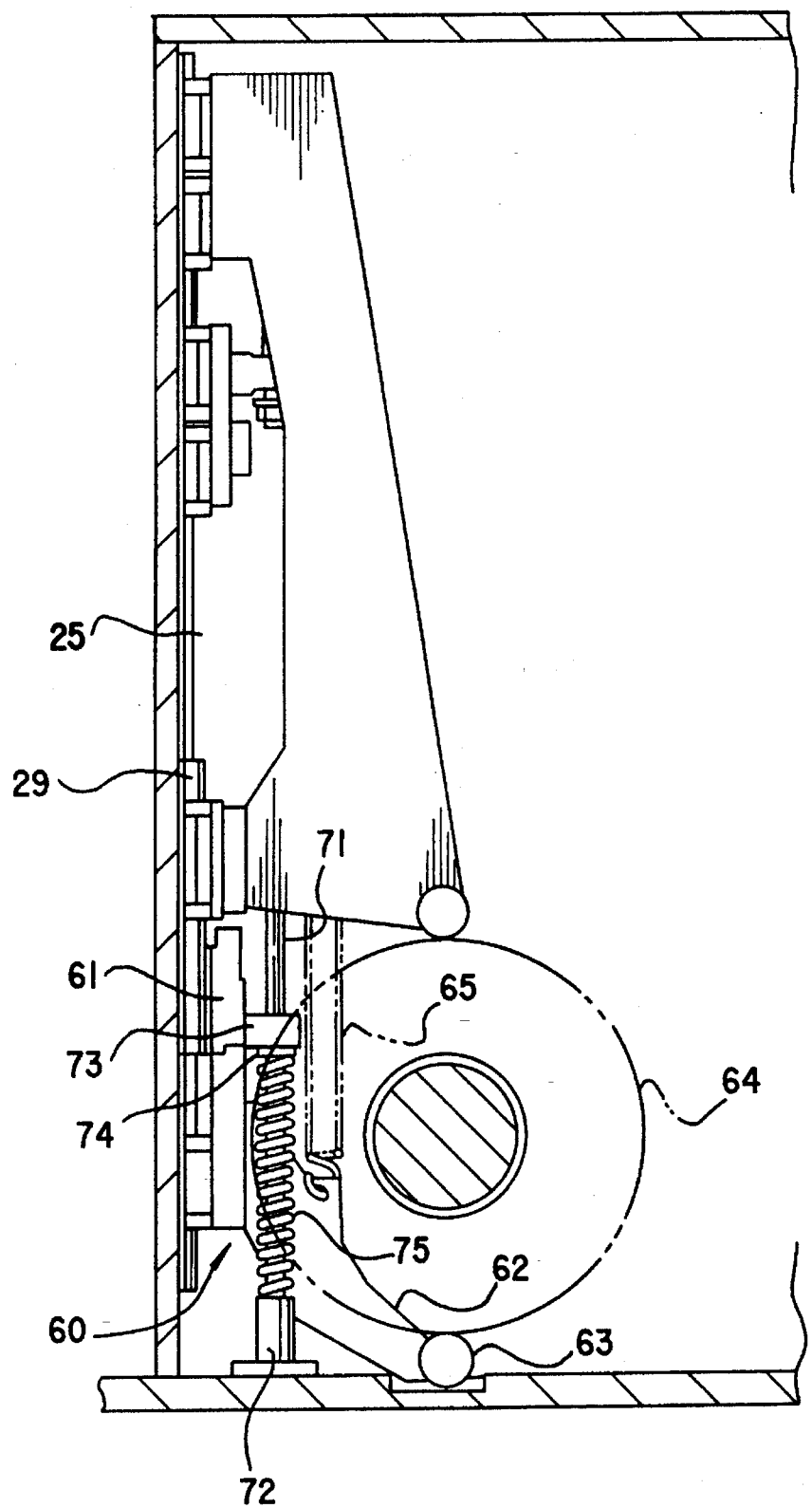
FIG. 14 is a view in the direction of the arrow XIV in FIG. 13.

As shown in FIG. 13 and FIG. 14, the raise/lower mechanism 60 comprises a raise/lower arm 61 which the feeder head 40 is attached to and which is in slidable engagement with the guide rail 25, a cam follower 62 integrally connected to the raise/lower arm 61, a cam roller 63 rotatably supported by the cam follower 62, a cam 64 which the cam roller 63 follows and rolls over, and a spring 65 mounted between the cam follower 62 and the mount 2 for using the cam follower 62 upwardly so that the cam roller 63 is pressed against the cam 64 from below. The same driving axis is shared by both the cam 64 and the cam 28 of the raise/lower mechanism 22 for the perforating mechanism 4. 10 A second differential mechanism 70 is provided between the threading mechanism 5 and the cutter mechanism 6 to control the relative motion between both mechanisms 5 and 6. Furthermore, a third differential mechanism 80 is provided between the threading mechanism 5 and the perforating mechanism 4 to control the relative motion during threading between both mechanisms 4, 5.

Discussed next is the second differential mechanism 70. The second differential mechanism 70 comprises a guide rod 71 running parallel to the guide rail 25 and attached, at one end, to the raise/lower arm 48, a guide pipe 72 attached to the mount 2 for slidably engaging the other end portion of the guide rod 71 within, a bracket 73 integrally attached to the raise/lower arm 61 of the threading mechanism 5, for allowing the guide rod 71 to be slidably engaged within the bracket 73, a stop ring 74 disposed midway along the length of the guide rod 71 and pressed against the bracket 73 from below, a set spring 75 disposed between the stop ring 74 and the guide pipe 72 and urging the stop ring 74 against the bracket 73, and a stopper 76 installed midway along the guide rail 25 for restricting the raising movement of the cutter mechanism 6 by abutting the raise/lower arm 48 when the raise/lower arm 48 of the cutter mechanism 6 is raised to a predetermined limit.

When the threading mechanism 5 is put at the lower limit by the cam 64, the second differential mechanism 70 allows the set spring 75 to urge the stop ring 74 disposed on the guide rod 71 against the underside of the bracket 73 attached to the threading mechanism 5. The cutter mechanism 6 is held at its lower limit.

As the cam 64 rotates raising the threading mechanism 5, the set spring 75 still keeps urging the stop ring 74 against the bracket 73, and thus the cutter mechanism 6 and the threading mechanism 5 are raised in an integral motion. The integral raise motion continues until the cutter mechanism 6 is forced to stop by the stopper 76. Thereafter, the threading mechanism 7 is solely raised.

Discussed next is the third differential mechanism 80. The third differential mechanism 80 comprises an abutment plate 81 integrally attached to the raise/lower arm 61 of the threading mechanism 5 and facing the bottom end of the cam follower 26 of the perforating mechanism 4.

When the perforating mechanism 4 and the threading mechanism 5 are at their lower limit positions, the abutment plate 81 is spaced at a predetermined clearance to the cam follower 26. As the perforating mechanism 4 is raised, the abutment plate 81 is abutted by the cam follower 26. As a result, both the threading mechanism 5 and the perforating mechanism 4 are raised in an integral motion.

Figure 15:
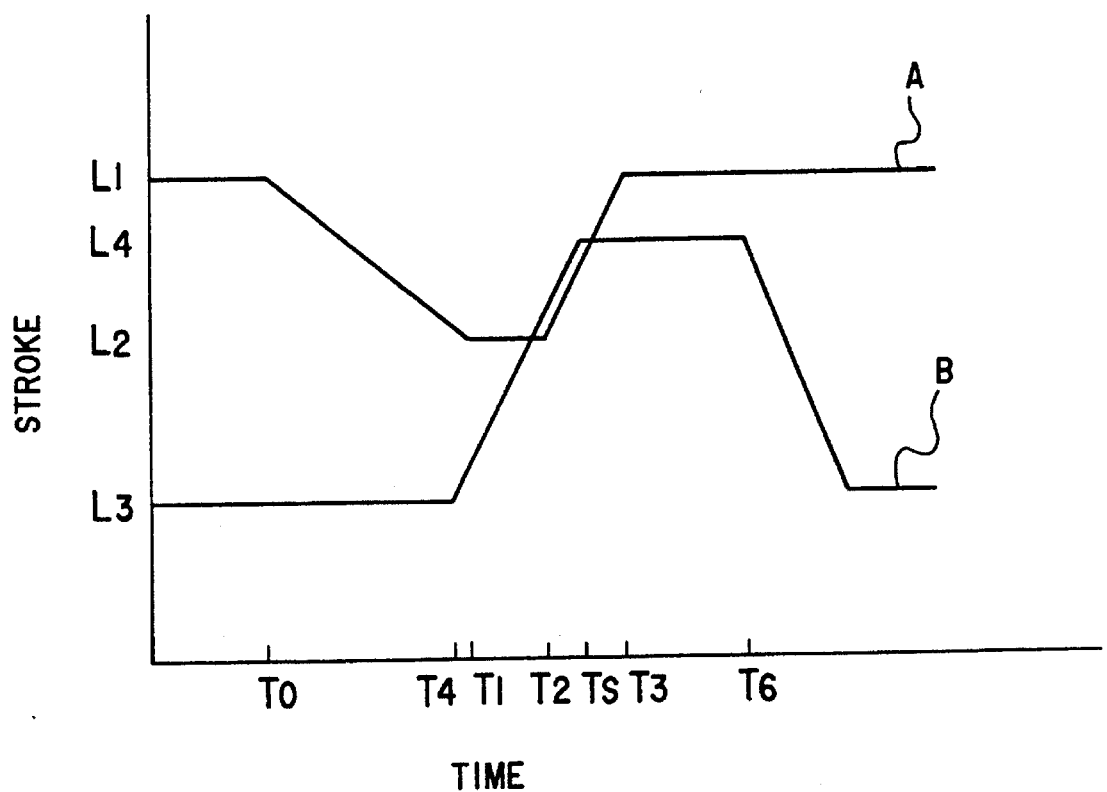
FIG. 15 is a diagram showing cam profiles for operating each mechanism in the present invention.

The cams 28 and 64 are designed to provide stroke profiles as shown in FIG. 15 to relatively control the perforating mechanism 4, the cutter mechanism 6 and the threading mechanism 5. The curve designated A is the profile of the cam 28 for controlling the perforating mechanism 4. The curve designated B is the profile of the cam 64 for controlling the threading mechanism 5.

Specifically, in the profile A, the cam 28 causes the perforating mechanism 4 to be lowered from the upper limit position L1 at time T0 to the lower limit position L2 at time T1, holds the perforating mechanism 4 at the lower limit position L2 until time T2, and then causes the perforating mechanism 4 to be raised and reach the upper limit position L1 at time T3. The perforating process to the scallops A and the rope P by the perforating mechanism 4 takes place during the latter half of the duration between T0 and T1.

In the profile B, the cam 64 starts raising the threaded mechanism 5 from its lower limit position L3 at the time T4, earlier than T1 at the moment the perforating process ends, causes the threading mechanism 5 to reach the upper limit position L4 at time T5 immediately before T3, and, at time T6 after a predetermined time of period from time T5, starts lowering the threading mechanism 5 toward the lower limit position to L3.

The abutment plate 81 of the threading mechanism 5 is designed to abut the cam follower 26 of the perforating mechanism 4 at the moment the curve A intersects the curve B between time T1 and time T2. Thereafter the threading mechanism 5 moves relative to the cutter mechanism 6 while moving integrally with the perforating mechanism 4. At the moment the curve A intersects the curve B between time T2 and time T3, the threading mechanism 5 and the perforating mechanism 4 are disengaged and start operating according to their own separate profiles.

Discussed next is the operation of the scallop hanger setting apparatus thus constructed.

As shown in FIG. 3, the culturing rope P is routed through the guide channels 11c of the link plates 11 on the transport portion 3a of the transport mechanism 3. While the conveyor 12 of the transport mechanism 3 is advanced in a stepwise manner by a link pitch of the link plate 11 at a time, a pair of scallops, one from each side, are inserted into link plates 11 upstream of the transport portion 3a. One scallop above and the other scallop below the rope are positioned in such a way that one side-flange of each scallop is pressed against the rope P from above and from below as shown in FIG. 5. At the same time the stack point of the side-flanges of the scallop and the rope P is aligned with the through-hole 11c.

In this state, the lower link plate 11 of the conveyer 12 of the transport mechanism 3 is supported by the downside guide 10 plate 17. The press levers 13 are guided by the upper guide plate 18 in such a way that the upside guide plate 18 restricts the rotation of the press levers 13. When inserted as above, scallops are seated into the tray portions 11b of the link plates 11 while elastically deforming the brush 14 installed on each press lever 13.

Elastic force of the brush 14 is exerted on each scallop A pressing it against the tray portion 11b of the link plate 11 and holding it in correct position. Such insertion process of the scallop is sequentially performed to the link plates 11 introduced into the upstream of the transport portion 3a by the stepwise motion of the conveyer 12, making the scallops seated on the transport mechanism 3.

Since a step is introduced between both side tray portions 11b of each link plate 11 in this embodiment, positioning process is easily made so that one side-flange of one scallop A shell comes above the rope P and one side-flange of the other scallop A comes below the rope P.

The scallop shell is generally made up of two halves of shell having different shades of grades; one valve is darker than the other in appearance.

When positioning the scallops onto the link plates 11, this difference may be used in such a way that the dark side of one scallop A is up on the upper seating surface or tray portion of the link plate and the white side of the other scallop is up on the lower seating surface of the link plate. This arrangement allows the scallops to be stacked on the rope P at their side-flanges which are far to their hearts compared to their other side-flanges.

Since the perforating mechanism 4 perforates a scallop at its one shell side-flange that is farther to its heart than its other shell side-flange, adverse effect by perforation process is prevented from reaching its heart. This substantially improves survival rate of the scallop after the hanging process.

As the conveyer 12 advances in a stepwise manner, the scallops and the culturing rope P positioned in place on the link plate are stopped to face the perforating mechanism 4, the threading mechanism 5 and the thread cutter mechanism 6. During this stop, the perforating mechanism 4, the threading mechanism 5, the cutter mechanism 6 and the threading mechanism 7 are sequentially operated.

Each process of these mechanisms is now discussed. The perforating mechanism 4 is kept at its upper limit portion by the cam 28 as shown in FIG. 13 while the conveyor 12 is bringing scallops A with the rope P properly positioned thereupon. The upper and lower thread pressing mechanism 7 are left with their teeth fully opened. At the moment the cam 28 is activated, the drill 19 and its drill guide 20 of the perforating mechanism 4 starts lowering, and the drill 19 is driven by the electric motor 21.

Figure 16:
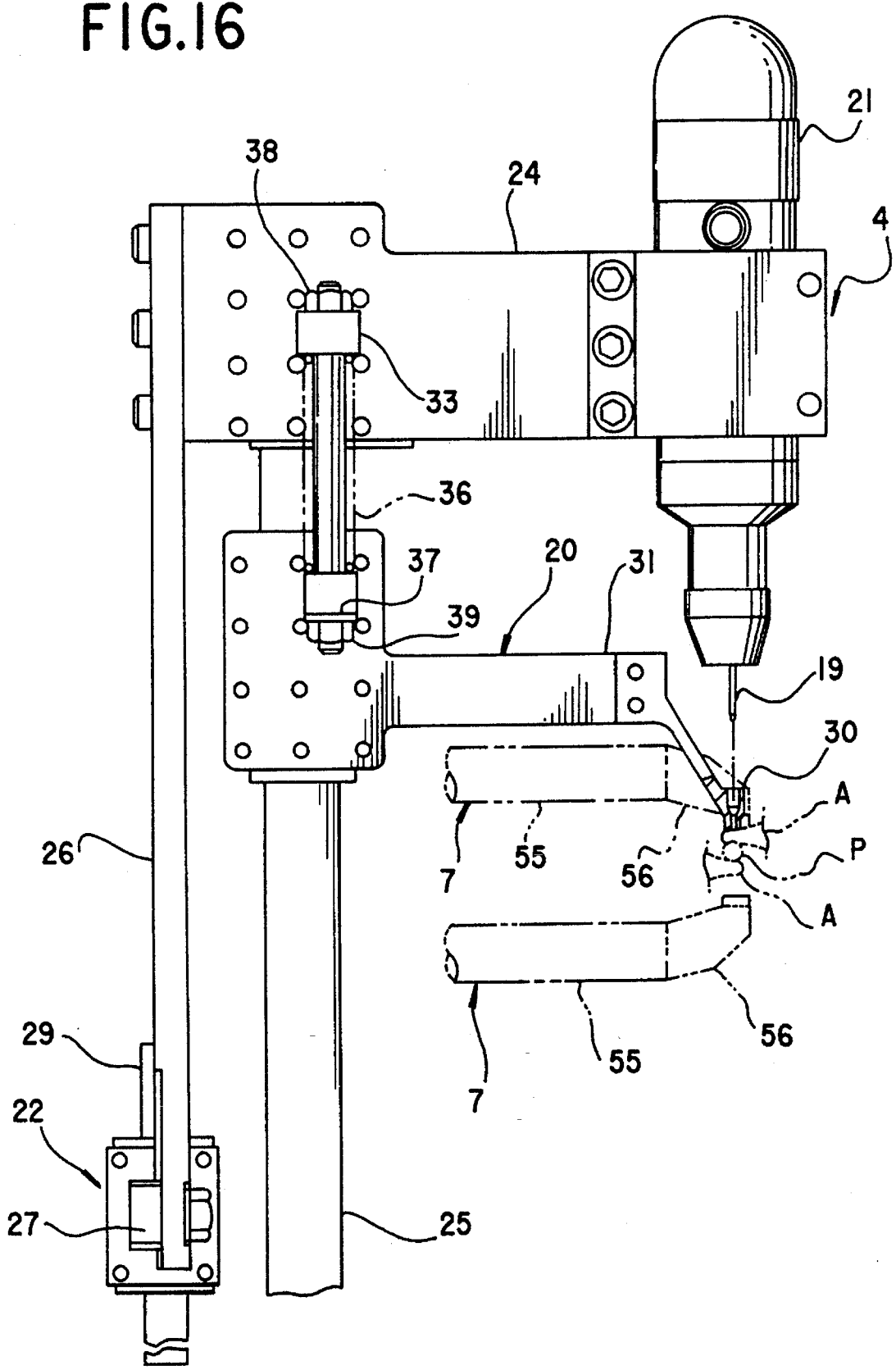
FIG. 16 illustrates the operation of the perforating mechanism.

The tip of the guide pipe 30 of the drill guide 20 touches the top surface of the side-flange of the scallop A, holding the side-flange of the scallop onto the culturing rope P (see FIG. 16).

The drill 19 moves relative to the drill guide 20 while compressing the compression spring 36 disposed between the drill guide stay 31 and the motor stay 24. After passing through the guide pipe 30, the drill 19 perforates an upper scallop A, a culturing rope P and then a lower scallop sequentially in that order. Thus, through-holes are perforated as shown in FIG. 5.

Figure 17:
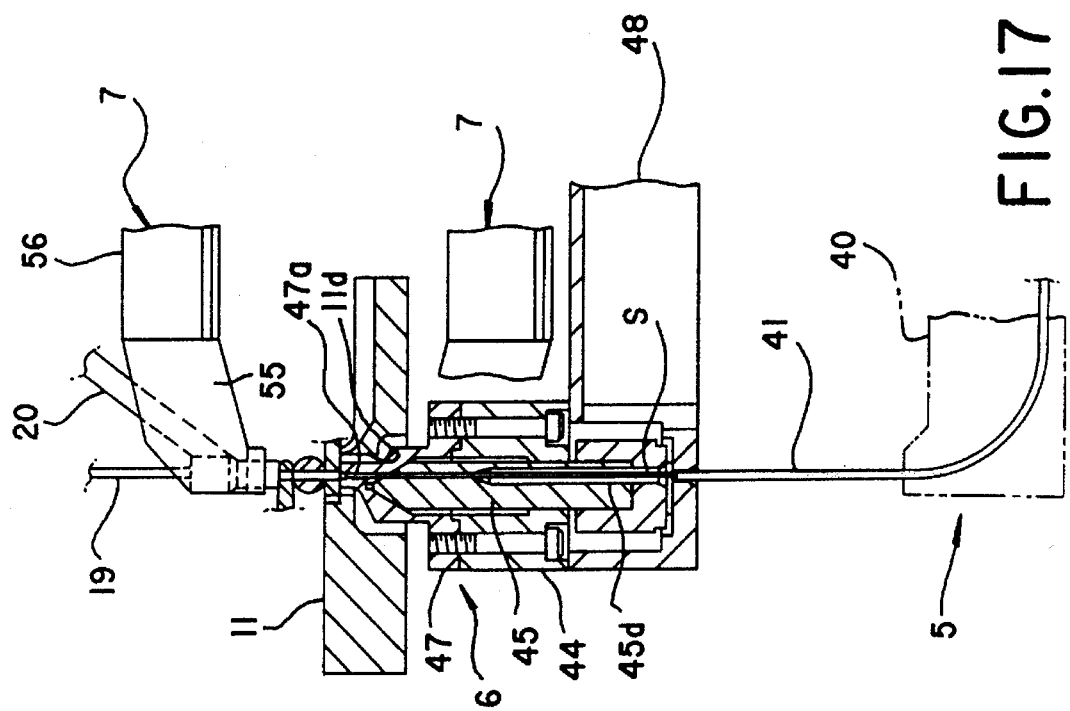
FIG. 17 illustrates the operation of the perforating mechanism, the threading mechanism and the cutter mechanism.

After the perforating process is thus completed, the cutter mechanism 6 and the threading mechanism 5 are raised from below the link plate 11 as shown in FIG. 17, and the through-hole 47a disposed in the lid 47 of the cutter mechanism 6 is aligned with and set near to the through-holes in the scallops and the culturing rope P.

Figure 18:
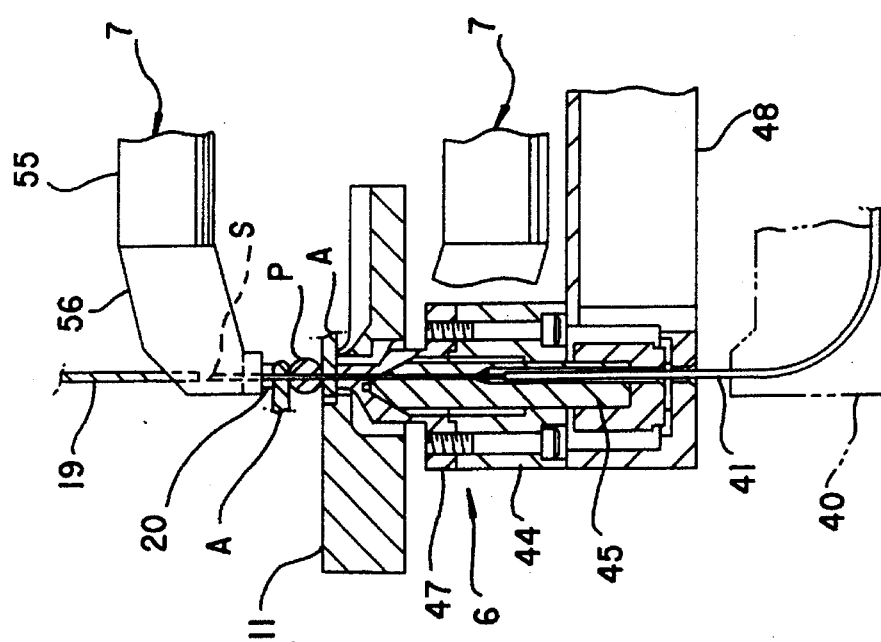
FIG. 18 illustrates the operation of the perforating mechanism, the threading mechanism and the cutter mechanism.

Although the raise operation of the cutter mechanism 6 is stopped, the threading mechanism 5 is still continuously raised. As shown in FIG. 18, the guide pipe 41 is inserted by a predetermined length from below into the guide hole 45b of the cutter 45. This operation pushes the top portion of the thread S remaining in the cutter 45 out of the cutter 45, allowing the top portion of the thread S to pass through the through-holes in the scallops and the culturing rope P and to project upwardly. The thread S is pushed upwardly because friction resistance takes place between the curved portion of the guide pipe 41 and the thread S itself and this frictional resistance prevents the thread S from being pushed into the guide pipe 41.

In the course of the insertion of the thread S, the third differential mechanism 80 causes the threading mechanism 5 and the perforating mechanism 5 to move in an integral motion. The tip of the thread S is set near the tip of the drill 19 that is at its lower limit position. The drill 19 and the thread S are concurrently raised with the relative separation kept therebetween.

In the above operation, with the drill guide 20 still pressing the side-flanges of the scallops against the culturing rope P, the thread S is inserted through from below replacing the drill 19 as the drill 19 is retracted upward. The drill 19 keeps avoiding displacement of both scallops and the rope until the thread S is completely inserted through.

When the thread S is projected upwardly above the upper scallop A, the upper pressing mechanism 7 is first activated. The projected end portion of the thread S is gripped between the teeth 56. The upper pressing mechanism 7 further presses the thread S to flatten it as shown by dotted line in FIG. 19.

Next, the threading mechanism 5 is lowered as shown in FIG. 19. As the threading mechanism 5 is lowered, the thread S is pulled out of the guide pipe 41 by the length equal to the downward travel by the threading mechanism 5, because the top end of the thread is continuously gripped by the pressing mechanism 7. Next, both the cutter mechanism 6 and the threading mechanism 5 are lowered by a small travel in an integral motion, and the oscillating means 46 rotates the cutter 45 in the direction of the arrow in FIG. 19. The thread S is thus cut at a sharp surface by the interface between the cutter 45 and the lid 47 of the head casing 44.

Next, both the cutter mechanism 6 and the threading mechanism 5 are lowered again by a small travel, and thus the cutter mechanism 6 clears the lower portion of the thread S that has pierced both scallops and the culturing rope P. The lower pressing mechanism 7 is then activated to flatten the lower end portion of the thread S as shown by the dotted line in FIG. 20.

The thread S has thus been flattened at both end portions by pressing, preventing both scallops from coming off from the culturing rope P and thus leaving both scallops to be hung on the culturing rope P.

The thread S is released out of grips by the upper and lower pressing mechanisms. The transport mechanism 3 advances the conveyor 12 by a pitch of the link plates 11, thus a subsequent link plate 11 is brought in between the perforating mechanism 4 and the cutter mechanism 6 for positioning. The same processes are repeated thereafter, and scallops are sequentially hung on the culturing rope P.

The link plates 11 having the scallops attached on the culturing rope P and the press level 13 holding the scallops come out of engagement with both guide plates 17, 18. The link plates 11 are then wound up by the pulley 9 downstream of the transport portion 3a as shown in FIG. 4, and the press levers 13 are set free to rotate. At the earlier stage of winding by the pulley 9, the press levers 13 are allowed to slightly rotate by stiffness of the brush 14 that has been forced to deform. As the link plates 11 are wound further by the pulley 9, by their own gravity the press levers 13 further rotate and are opened away from the corresponding link plates 11.

The scallops A are naturally released out of hold between the link plates 11 and the press levers 13, and thus the scallops A and the culturing rope P are smoothly detached from the conveyor 12.

If the culturing rope P thus loaded with scallops is run vertically, the scallops are hung on the thread S piercing the culturing rope P, one scallop at each end of the thread S.

Figure 21:
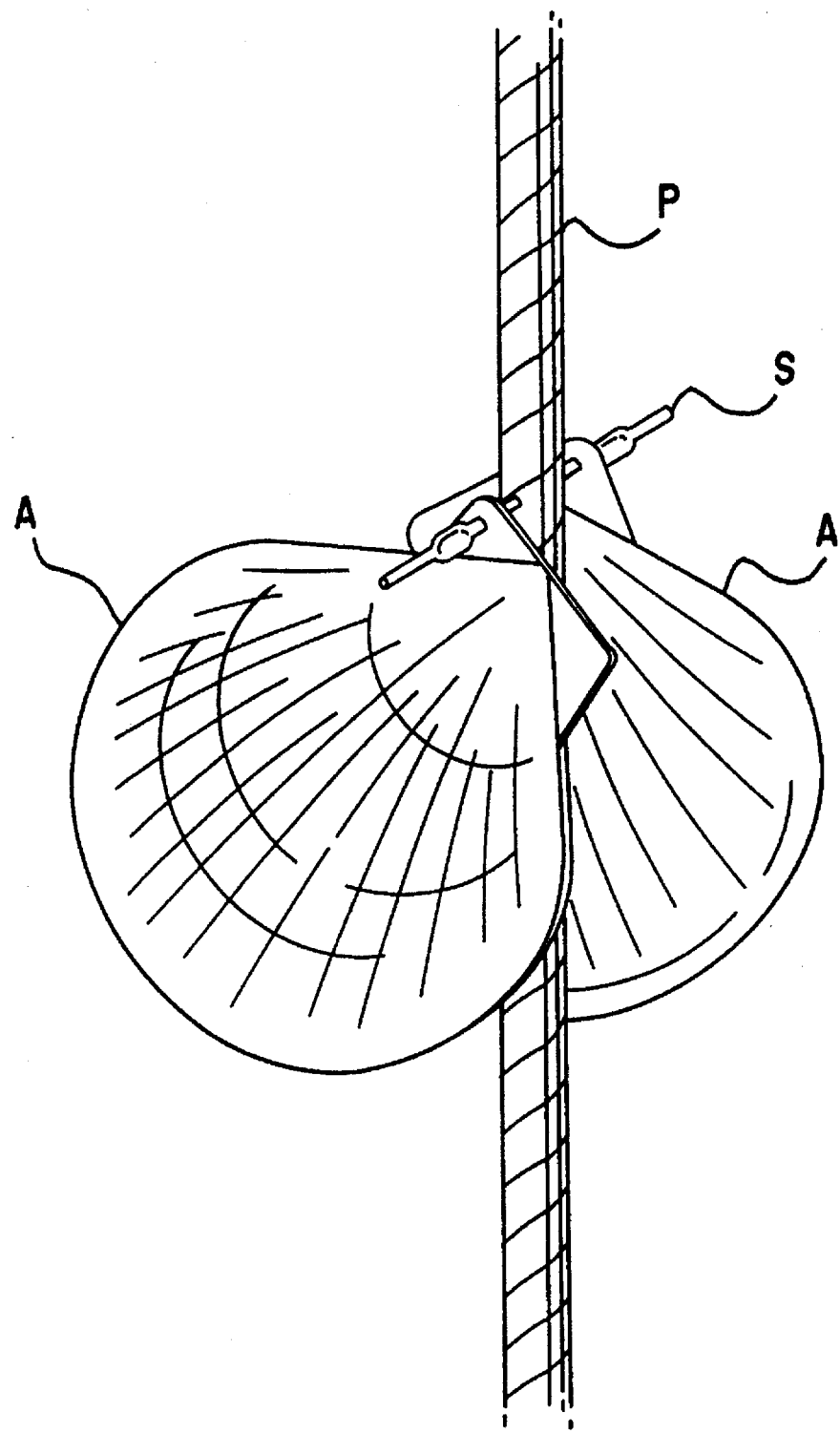
FIG. 21 is a perspective view showing the state of the scallops hung.

In this embodiment, the thread S is of a high flexural stiffness so that the thread S easily pierces through the through-holes in the scallops and the culturing rope P. The thread S piercing the culturing rope P extends almost horizontally in a bar-like manner as shown in FIG. 21.

Although the scallops hung on both ends of the thread S are subject to agitation due to underwater currents, one scallop cannot reach the other across the culturing rope P, and thus one is unlikely to bump against the other. Since the culturing rope P serves as a cushion, the effect of impact remains small if each scallop bumps against the rope P.

Since there are no impacts arising from mutual bumps, the scallops that are attached onto the culturing rope P using the scallop hanger setting apparatus according to the embodiment do not close their shells. This allows the scallops to absorb sufficiently underwater oxygen and nutrients and thus to rapidly grow.

If the thread S holding the scallops A onto the culturing rope P is even shorter, a culturing rope is set with a pair of scallops sandwiching the culturing rope P at their side-flanges from both sides as shown in FIG. 15. This arrangement causes the body of each scallop to be close to the culturing rope P, thus restricting the movement of the scallops A, controlling unnecessary energy consumption by the scallops, and thereby allowing the scallops to grow rapidly.

According to the embodiment of the scallop shell side-flange hanger apparatus thus constructed, the transport mechanism 3 is made up of a plurality of link plates 11 and the press levers 13 rotatably supported by the corresponding link plates 11, and these link plates 11 are connected in an endless fashion and wrapped around a pair of pulleys 9, 10. Scallops A are horizontally held between a link plate 11 and a press lever 13 for transport, and thus positioning of the scallops on the transport mechanism 3 is easy and displacement of the scallops in the course of transport is restricted. The scallop hanger setting apparatus offers a substantial improvement in the ease of handling. In the perforating process, position accuracy for perforation is enhanced, and continuous through-holes are perforated through a stack of both scallops and a culturing rope P. Thus, the attaching of the scallops onto the culturing rope P is performed assuredly.

Generally vertically arranged with respect to the transport mechanism 3 are the perforating mechanism 4, the threading mechanism 5, the cutter mechanism 6, the thread pressing mechanism 7 and the like. Such an arrangement helps reduce horizontal dimensions of the apparatus. Space is thus saved at the installation of the apparatus. If a sufficient space is available, the transport portion 3a of the transport mechanism 3 is lengthened to increase the area of insertion on the conveyor 12 for the scallop A. This achieves an increased speed of the transport mechanism 3, and thus offers an improved working efficiency.

When the scallops that underwent hanging process to the culturing rope P are detached from the transport mechanism 3, the link plates 11 are first wound by the pulley 9. Then, the press levers 13 that have held the scallops A are opened with its own gravity and release the scallops A. The release operation is thus smoothly done.

In this embodiment, the cutting mechanism 6 cuts the thread S at a slant angle, and thus the cut surface is of a sharp form. This assures that the thread S pierces smoothly into the scallops A and the culturing rope P. This also contributes to an enhancement in work efficiently.

According to the embodiment of the scallop hanger setting apparatus, while the drill guide 20 holds firmly the flanges of the scallops against the culturing rope P, the thread S is guided through the through-holes in the scallops and the culturing rope P following the tip of the drill 19 that is being withdrawn after perforating the through-holes. No displacement of the through-holes in the scallops and the culturing rope P takes place in alignment while the thread S is inserted into the through-holes. Thus, perfect insertion of the thread S is assured.

It should be noted that the configurations and dimensions of the mechanisms quoted above are for illustrative purposes only and that a variety of modifications of these are possible.

In the above embodiment, the transport mechanism is advanced in a stepwise manner. During each stop period, perforating process, threading process and other processes take place to the scallops A and the culturing rope P. Alternatively, it is contemplated that the perforating process, threading process and other processes are performed while the transport mechanism 3 is advanced at a constant speed with the perforating mechanism 4, the threading mechanism 5 and other mechanisms all designed to follow the transport mechanism 3 in the same direction. In such an arrangement, these mechanisms are arranged in a vertical orientation, and the space required for the travel of these mechanisms are limited to space above the transport mechanism 3. Therefore, the need for extra installation space around the transport mechanism 3 is minimized.

Figure 22:
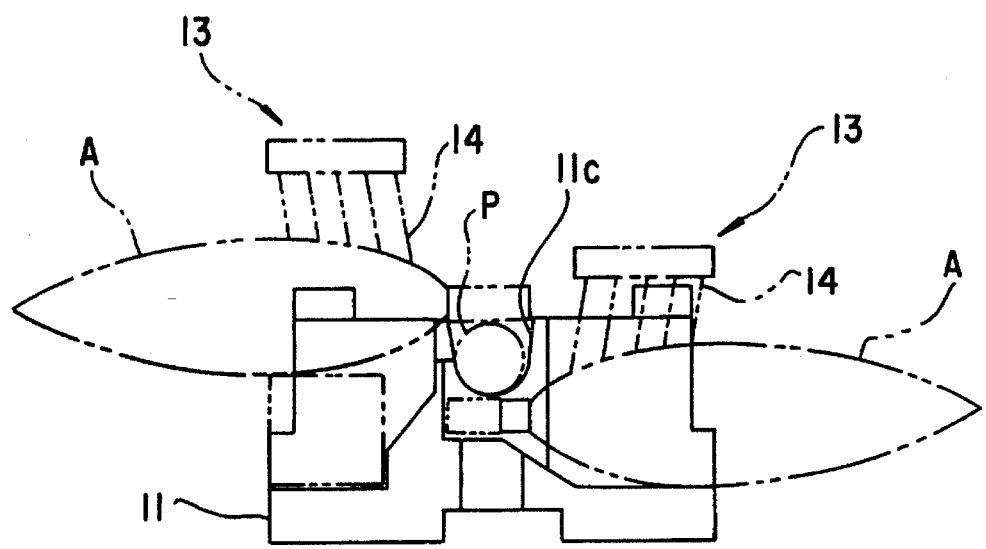
FIG. 22 is a diagram showing another embodiment of the present invention.
Figure 23:
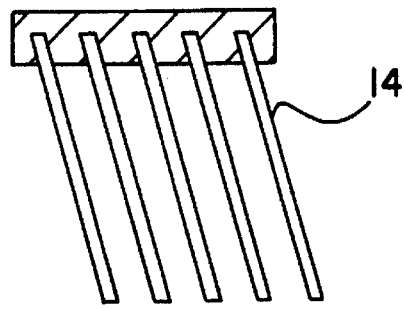
FIG. 23 shows an example of the brush of FIG. 22.

FIG. 22 and FIG. 23 show another embodiment. This embodiment uses a brush 14 having a number of bands, each band made of 20 lines, each line made of 0.34 mm diameter nylon-6 line. The brush 14 is tilted by a predetermined angle (15 degrees, for example) from a vertical line inwardly (i.e., toward the guide channel 11c of each link plate).

The tilted brush 14 urges the scallops A toward the guide channels 11c of each link plate 11 (toward the center of the link plate 11 in FIG. 22) when the scallops are held between each link plate 11 and its corresponding levers 13. This arrangement assures that the scallops are firmly seated on the link plates 11 rather than come off sideways.

Figure 24:
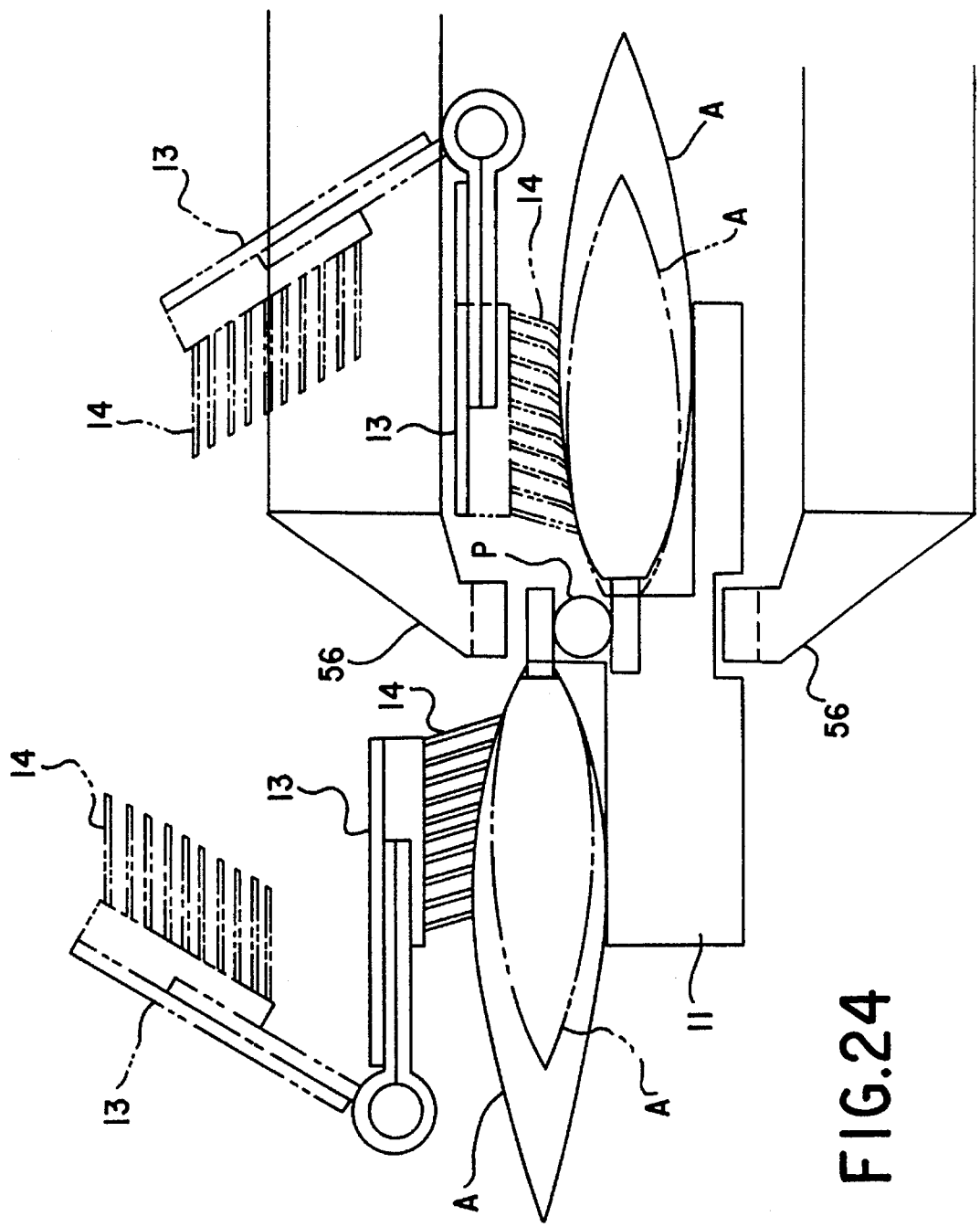
FIG. 24 is a diagram showing another embodiment of the present invention.
Figure 25:
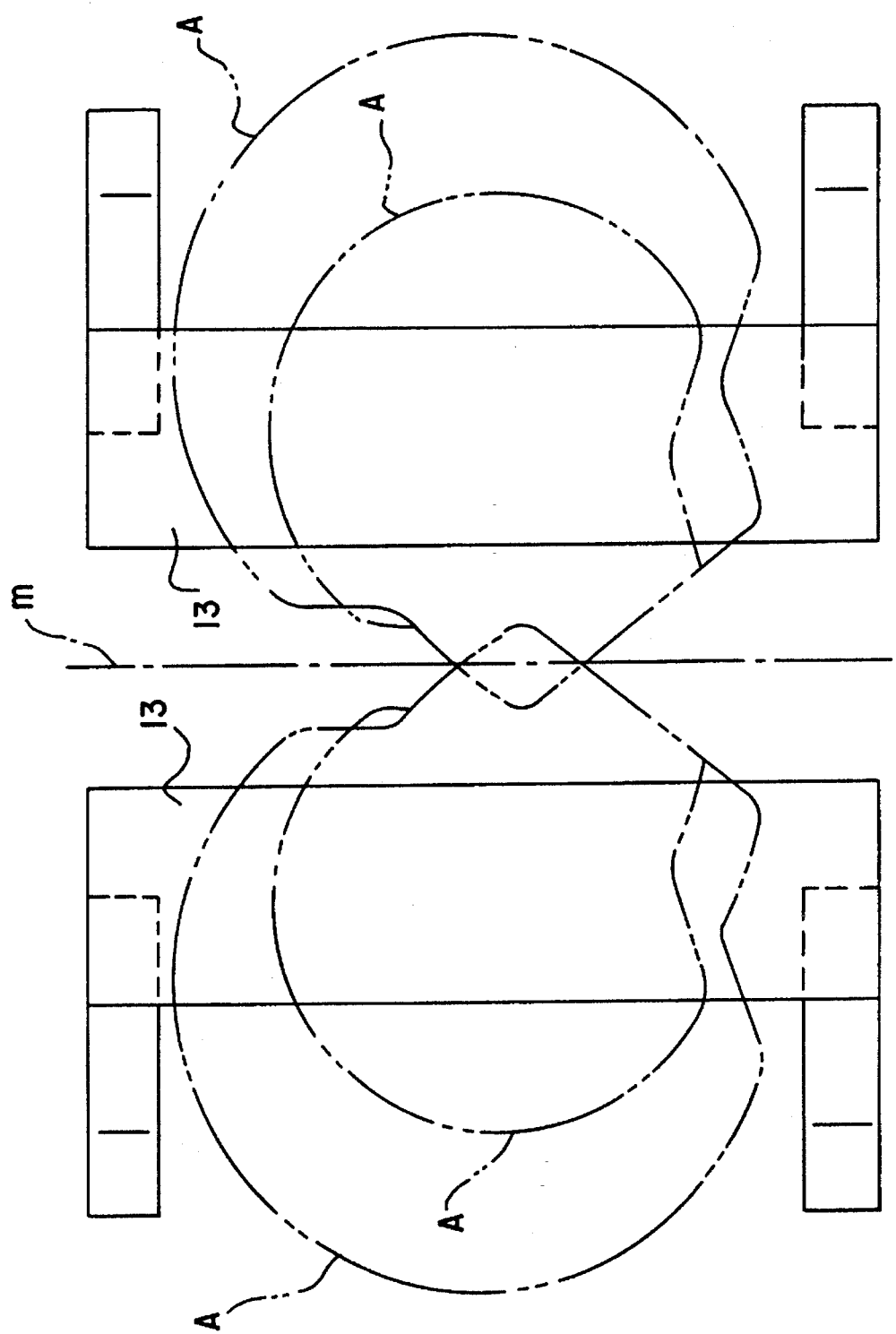
FIG. 25 is a plan view of FIG. 24.

FIG. 24 and FIG. 25 show another embodiment. In preceding embodiments, the press levers 13 are rotatably supported at the forward end of the link plates 11 by the link pins 16. In this embodiment, however, press levers 13 are supported at the link plates 11 by unshown arms in such a way that the press levers 13 are rotatable within a predetermined angle (from horizontal upward to a 60 degree elevation) in a plane perpendicular to the direction of advance of the link plates 11.

In this embodiment as shown in FIG. 25, a pair of scallops A are symmetrically aligned relative to the center line m (representing the culturing rope P) of each link plate in a plan view (i.e., if viewed from above). Namely, the pair of scallops are seated with the body of one scallop on the left-hand side and the body of the other on the right-hand side with respect to the axis of through-holes for a thread S perforated in the rope P.

In this embodiment, like the preceding embodiments, the scallops are firmly seated by means of the brush 14 between the link plates 11 and the press levers 13 in a predetermined position and alignment.

If a pair of scallops A are aligned so that the border between the scallop A shell body and its side-flanges is arranged generally in parallel to the culturing rope P as shown in FIG. 25, the swell of the scallop A body is kept free from touch with the culturing rope P.

The side-flange of the scallop A is thus firmly pressed onto the culturing rope P, and thus the length of the thread S that attaches the scallops A to the culturing rope P may be even shorter.

According to these embodiments of the scallop hanger setting apparatus, a wire member hanging the scallops onto a culturing rope P extends piercing the culturing rope P in a bar-like fashion. The scallops hung onto the culturing rope P by the wire member are restricted from free movement. The scallops are thus unlikely to bump against each other across the culturing rope P. If there are no bumps, the scallops are not alarmed and do not close their shells. This allows the scallops to absorb sufficiently underwater oxygen and nutrients and thus to rapidly grow.

According to these embodiments of the scallop hanger setting apparatus, a pair of scallops are connected in a manner that the side-flanges of each scallop sandwich a culturing rope P from both sides. The scallop shell bodies touch the culturing rope P, and their movement is largely restricted. The scallops are restricted from unnecessary movement which would consume their energy, and thus their growth is rapid.

According to these embodiments of the scallop hanger setting apparatus, scallops are positioned to the culturing rope P in a manner that one side flange of the pair of side-flanges of a scallop is firmly attached onto the culturing rope P. Thus, no displacement in alignment takes place while the through-holes for the hanging thread are perforated. Inefficient manual work such as correcting an unsatisfactory hanging work is eliminated, and efficiency in hanging work is thus substantially improved.

The wire member hanging the scallops onto the culturing rope P can be shortened so that hung scallops are restricted from free movement. This prevents the scallops from consuming energy unnecessarily, and thus allows the scallops to grow rapidly.

According to these embodiments of the scallop hanger setting apparatus, the scallops are positioned in alignment so that the border between the body shell of the scallop and its flanges generally roughly runs parallel to the culturing rope P. The swell of the body of the scallop is kept from touching the culturing rope P, and thus positioning is performed with the flange of the scallop firmly pressed against the culturing rope P. The wire member hanging the scallops onto the culturing rope P is thus shortened, and the movement of the scallops is restricted.

According to these embodiments of the scallop hanger setting apparatus, the scallops are positioned in alignment so that, from among a pair of side-flanges of a scallop, one side-flange of the scallop that is far from its heart, rather than the other side-flange that is nearer the heart, is firmly attached onto the culturing rope P. The through-hole for threading is perforated through the side-flange far from the heart. Adverse effect to the scallop heart is thus prevented. This substantially increases survival rate of the scallops that have undergone the hanging operation.

According to these embodiments of the scallop hanger setting apparatus, a pair of scallops are hung with the body of one scallop on the left-hand side and the body of the other on the right-hand side with respect to the rope P. The scallops do not touch each other and the side-flange of the scallop shell is firmly connected to the culturing rope P.

According to these embodiments of the scallop hanger setting apparatus, a step is provided in the seating surface of the positioning member where the scallops are seated, and the positioning member positions scallops against the culturing rope P. When a pair of scallops are thus positioned in alignment, positioning process is easy such that one side flange of one scallop is positioned on the culturing rope P and one side-flange of the other scallop is positioned below the culturing rope P. This achieves an increased efficiency in hanging work.

According to these embodiments of the scallop hanger setting apparatus, the flanges of scallop shells are continuously and firmly held onto the culturing rope P from before the drill starts perforating the flanges of the scallop shells and the culturing rope P until the completion of insertion of the thread by the threading mechanism. No displacement is introduced in the alignment of the through-holes of the scallops and the culturing rope P in the course of perforation. The threading mechanism thus threads a wire member in an assured manner. In a conventional practice, for example, each time a hanger apparatus aborts threading a wire member into the through-holes of the scallops and the culturing rope P, the hanger apparatus is stopped for an operator to manually insert the wire member into the through-holes of the scallops and the culturing rope P. Such an inefficient job is eliminated. Substantially improved efficiency in hanging work thus results.

Embodiment 2

A second embodiment of the scallop hanger setting apparatus according to the present invention is different from the embodiment 1 in that a water feeder is added to the cutter mechanism. The rest of the embodiment 2 remains unchanged from the embodiment 1. Discussed here are the features particular to the embodiment 2.

Figure 26:
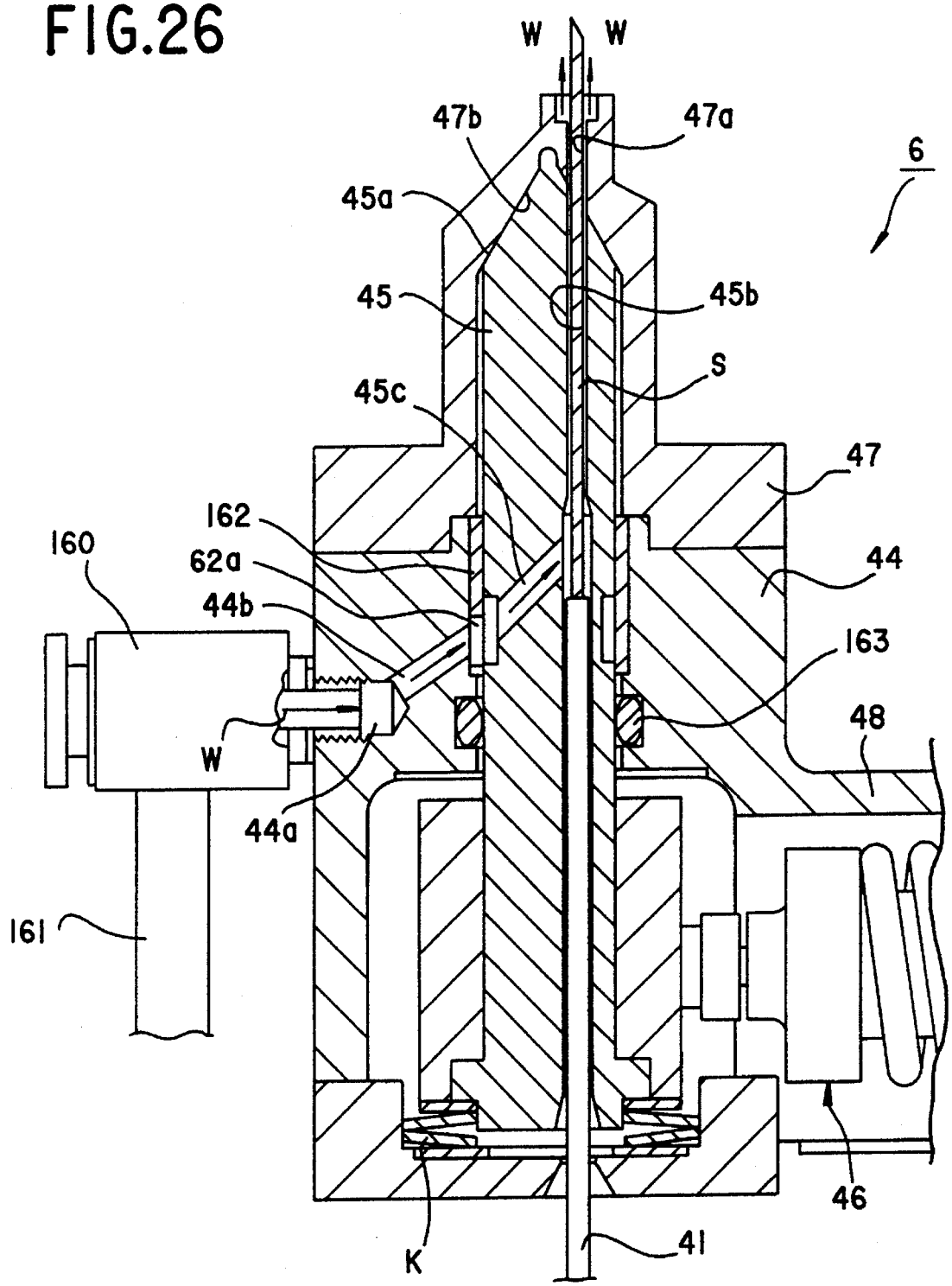
FIG. 26 is a vertical cross-sectional view showing the threading mechanism and the cutter mechanism in an embodiment 2 of the scallop hanger setting apparatus according to the present invention.

As shown in FIG. 26, like the cutter mechanism in FIG. 4, the cutter mechanism 6 of the scallop hanger setting apparatus according to this embodiment comprises the head casing 44 which is reciprocated vertically within a predetermined stroke by the driving mechanism 8, a cylindrical cutter 45 which is disposed within the head casing 44 and which is supported by a bush 162 in a manner that allows the cylindrical cutter 45 to rotate around a vertically oriented axis, oscillating means 46 that oscillate the cutter 45 within a predetermined angle, a lid 47 disposed on the head casing 44, and a seal 163 for preventing fed water W from leaking out into an oscillating mechanism 48.

The lid 47 is provided with a guide hole 47a, running in alignment with the axis of the drill 19, for guiding a wire member S therethrough. Furthermore, the cutter 45 is provided with a through-hole 45b through which the thread S is routed. The through-hole 45b is normally aligned with the guide hole 47a.

The cutter 45 is coated with a laminate of titanium compound, titanium carbide and aluminum oxide so that the cutter 45 is free from corrosion even if seawater is introduced into the cutter mechanism 6.

The head casing 44 in the embodiment 2 has on its side a partially closed end hole 44a. The partially closed end hole 44a has a path 44b that communicates with the cylinder hole that houses the cutter 45. The bush 162 has a through-hole 62a that meets the path 44b. The cutter 45 is provided with a path 45c that communicates with the through-hole 62a and the through-hole 45b.

Screwed in the hole 44a is a solenoid valve 160 which controls the flow of seawater W fed through a piping 161. The solenoid valve 160 is designed to open the path for the seawater W at least when the drill 19 is driven. The solenoid valve 160 thus feeds the seawater W into the through-hole 45b via the path 44b, the through-hole 62a in the bush 162, and the path 45c in the cutter 45. The seawater W fed into the through-hole 45b is delivered out of the opening of the guide hole 47a in the lid 47 at the drill 19 side.

A fine debris is generated when the drill 19 perforates the scallops A and the culturing rope P or when the drill 19 is withdrawn out of the through-holes at the time the perforating mechanism 4 is raised. The debris could fall into the cutter mechanism 6. In the above arrangement, however, the debris is blocked by the seawater W pushed out of the opening of the guide hole 47a at the drill 19 side, and cannot enter into the cutter mechanism 6.

The fine debris of the scallop shell and the culturing rope P cannot enter into the guide hole 47a in the lid 47 and the through-hole 45b in the cutter 45. Therefore, it is unlikely that any debris interferes with a smooth routing of the thread S toward the through-holes in the scallops A and the culturing rope P. It is also unlikely that any debris intrudes between the female tapered conical surface 47b of the lid 47 and the male tapered conical surface 45a of the cutter 45 to widen the clearance between both surfaces and to cause the cutter 45 to be incapable of cutting the thread S.

In the embodiment 2, the solenoid valve 160 is employed to control the seawater W fed into the cutter mechanism 6. Alternatively, another type of valve is perfectly acceptable. Furthermore, the seawater may be continuously fed into the cutter mechanism 6 regardless of whether the drill 19 is rotating or not.

As described above, the scallop hanger setting apparatus according to the embodiment 2 is free from problems such as a failed routing of the thread toward the through-holes of the scallops A and the culturing rope P or an unsuccessful cutting of the thread S. The above arrangement enhances the efficiency of hanging work, and hanging work is performed continuously and efficiently.

Embodiment 3

The embodiment 3 of the scallop hanger setting apparatus according to the present invention is characterized in that the axis of the guide hole in the cutter mechanism offsets from the axis of the drill of the perforating mechanism. The rest of the embodiment 3 remains unchanged from the embodiment 1.

Figure 27:
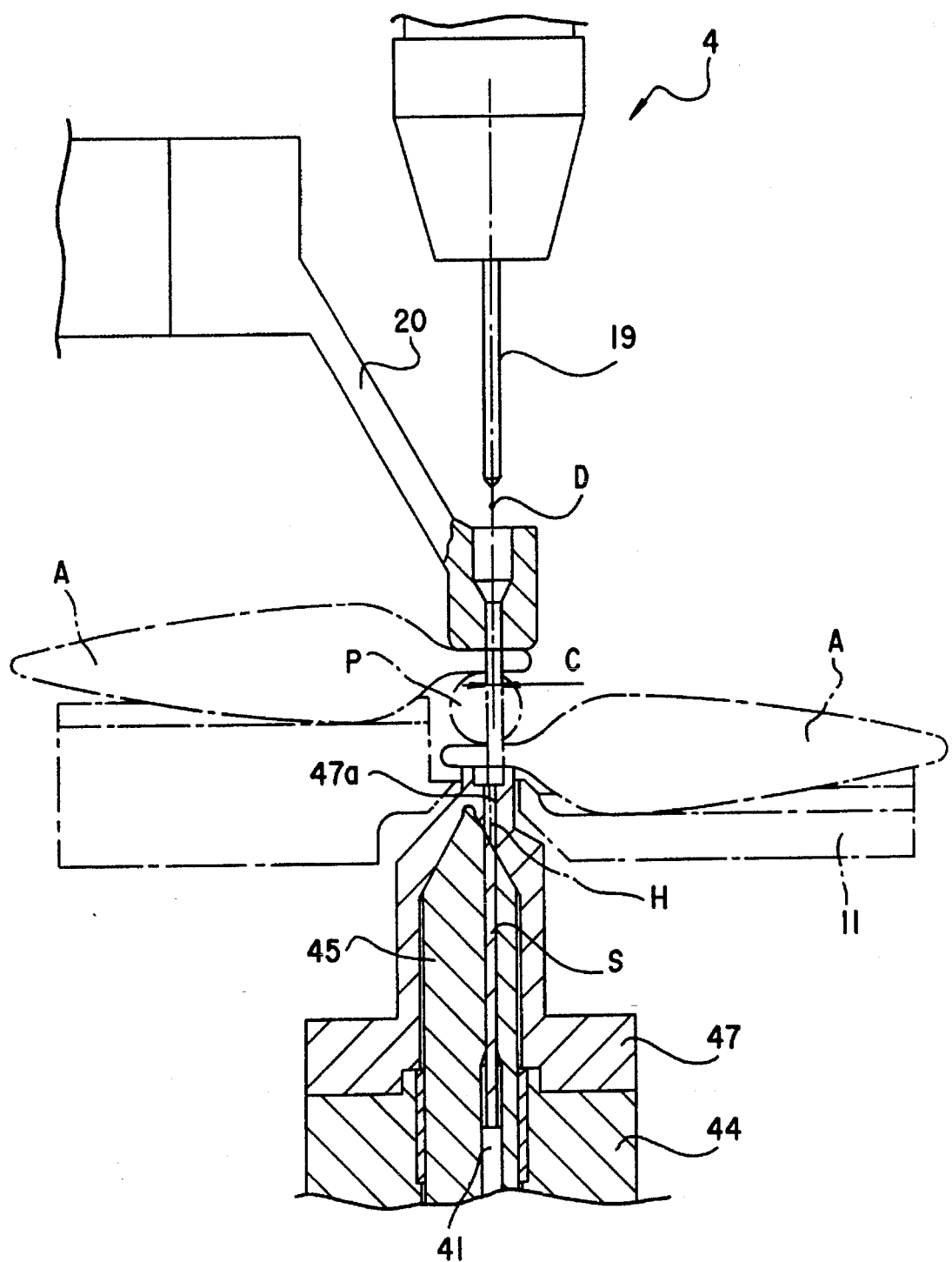
FIG. 27 is a vertical cross-sectional view showing the perforating mechanism, the threading mechanism and the cutter mechanism in an embodiment 3 of the scallop hanger setting apparatus according to the present invention.

In the scallop hanger setting apparatus according to the third embodiment, as shown in FIG. 27, both the axis D of the drill 19 of the perforating mechanism 4 and the axis H of the guide hole 47a in the lid 47 of the cutter mechanism 6 are vertically oriented (i.e., in a vertical direction on the sheet of FIG. 27). The axis D is offset from the axis H by a horizontal offset C.

While the thread is delivered out of the top opening of the guide hole 47a and reaches the underside opening of the through-hole in the scallop A, the thread S deviates from the axis H of the guide hole 47a due to the residual curls remaining in the thread S. Therefore, the magnitude and radial direction of the offset C relative to the drill 19 are respectively set equal to the magnitude and direction of the deviation of the thread S.

Although the top end of the thread S deviates from the axis H of the guide hole 47a while the thread S is delivered out of the guide hole 47a in the lid 47 of the cutter mechanism 6, the top end of the thread S is successfully inserted into the underside opening of the through-hole of the scallop A. This is because the offset of the through-hole of the scallop from the axis H is set equal to the magnitude and direction of the deviation of the thread S from the axis H.

The above arrangement prevents the top end of the thread S from being caught by the perimeter of the opening of the through-hole of the scallop and allows the thread S to be assuredly inserted into the through-holes of the scallops and the culturing rope P.

The thread S is wound around a take-up reel and stored under moisture-free atmosphere using a desiccant until use for hanging work, so that a uniform curl is preserved.

As the thread S is delivered out of the guide hole 47a in the lid 47 of the cutter mechanism 6, the top end of the thread S deviates from the axis of the guide hole 47a. The above-mentioned storage method, however, assures that the magnitude of the thread deviation from the axis H remains unchanged. The thread S is assuredly inserted into the through-hole of the scallop.

As described above, the third embodiment of the scallop hanger setting apparatus assures that the thread S delivered toward the through-holes of the scallops and the culturing rope P is successfully inserted into the through-hole without being caught by the perimeter of the opening of the through-hole. This enhances the efficiency of hanging work.

Embodiment 4

A fourth embodiment of the scallop hanger setting apparatus remains unchanged from the first embodiment except guide member separation setter means. The fourth embodiment of the guide member separation setter means is now discussed.

Figure 28:
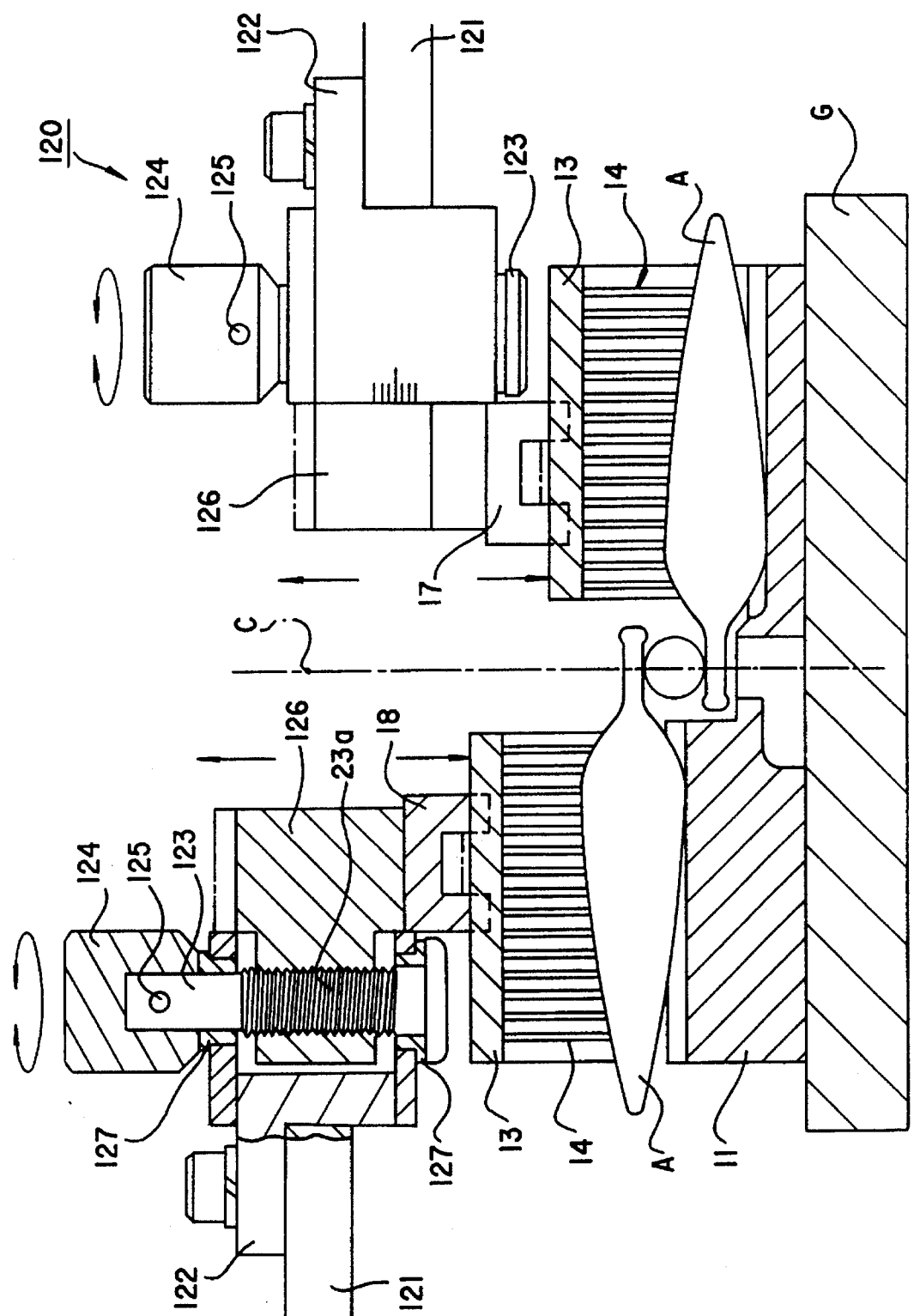
FIG. 28 is a front view showing guide member separation setter means and transport means in an embodiment 4 of the scallop hanger setting apparatus according to the present invention.

As shown in FIG. 28, a link plate 11 as a first plate is supported by a lower guide plate G as a guide member running horizontally on the unshown mount, in such a way that the link plate 11 is slidable on the guide plate G in the direction perpendicular to the sheet of FIG. 28. A pair of scallops are horizontally seated on the link plate 11 in symmetry relative to the axis C of the through-hole perforated in the flanges of the pair of scallops.

The pair of scallops are held against the link plate 11 by the brush 14 installed on a pair of press levers 13 as second plates. The flanges of the pair are held with a culturing rope P sandwiched therebetween.

The upper guide plates 17, 18 as guide plates run horizontally parallel to the lower guide plate G in order to guide each pair of press levers 13 toward the link plates 11 by abutting the press levers 13 from above. The upper guide plates 17, 18 are installed via a pair of guide member separation setter means 120 on respective ends of a pair of support members 121 that extend from the structure of the scallop hanger setting apparatus.

Referring to the FIG. 28, the guide member separation setter means 120 is now discussed.

The guide member separation setter means 120 comprises a holder 122 bolted to the end portion of the support member 121, an axis 23 which is vertically extending and which is rotatably supported via a pair of bushes 127 by the holder 122, a knob 124 secured to the top of the spring pin 125 and integrally rotatable with the axis 23, and a guide plate support member 126 mated with the thread portion 23a of the axis 23 in vertically slidable engagement with the holder 122.

Each of the upper guide plates 17, 18 is bolted to respective guide plate support member 126 so that they are integrally moved upwardly or downwardly.

The operation of the guide member separation setter means 120 is now described referring to FIG. 28 and FIG. 29. To adjust the separation between the lower guide plate G and each of the upper guide plates 17, 18, the knob 124 is turned by hand to rotate the axes 23 relative to the holders 122. The rotation of each axis 23 moves vertically respective guide plate support member 126 that is meshed with the thread portion 23a of the axis 23, relative to the holder 122. The upper guide plates 17, 18 that are bolted to respective guide plate support members 126 are thus moved upwardly or downwardly relative to the lower guide plate G. The separations therebetween are thus adjusted.

Figure 29A:
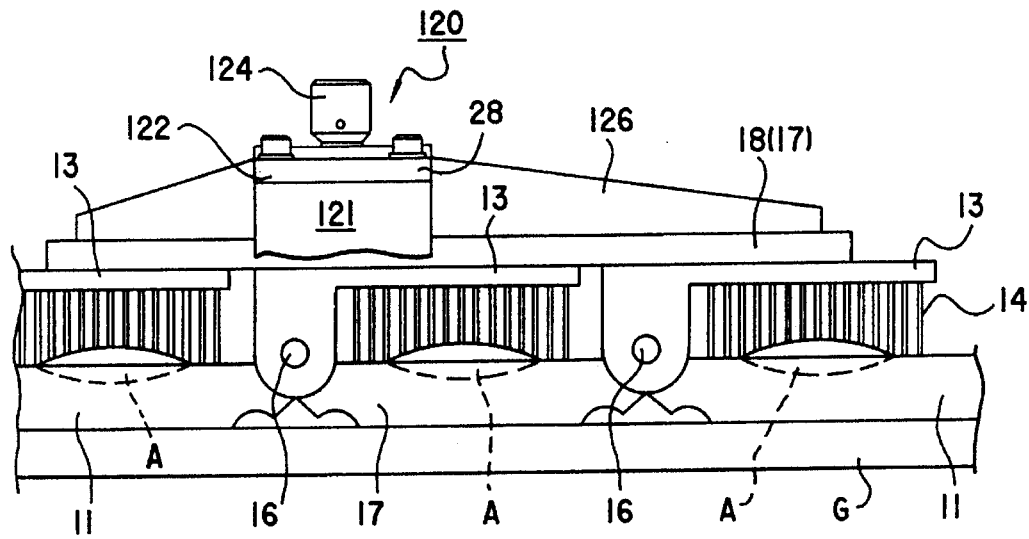
FIG. 29 is a side view showing the guide member separation setter means and the transport means of FIG. 28.

As shown in FIG. 29(a), when a smaller scallop is seated, the angle of opening between the link plate 11 and the press lever 13 may be narrowed by handling the guide member separation setter means 120 to set the upper guide plate 17 or 18 closer to the lower guide plate G.

The smaller scallop A is thus securely held between the brush 14 and the link plate 11.

Figure 29B:
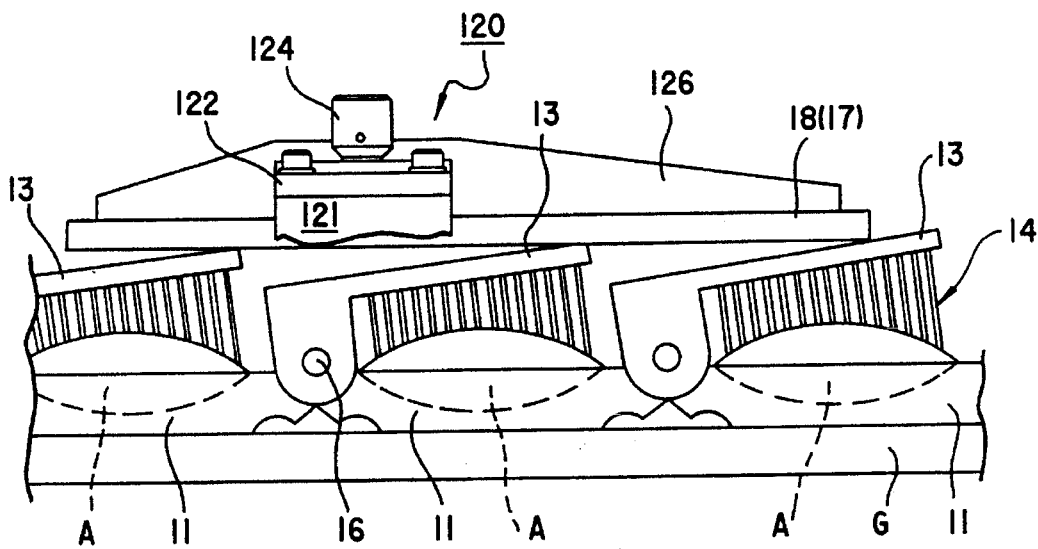

When a larger scallop is seated as in FIG. 29(b), the angle of opening between the link plate 11 and the press lever 13 may be widened by handling the guide member separation setter means 120 to set the upper guide plate 17 or 18 as far apart from the lower guide plate G. The larger scallop A is not pressed against by the brush 14 with excess force, and its flange is assuredly attached to the culturing rope P.

In this embodiment of the scallop hanger setting apparatus, the separations between the lower guide plate G and each of the upper guide plates 17, 18 are adjusted by simply turning the knobs 124 of the guide member separation setter means 120 by hand. Regardless of their size, the scallops A are firmly held between the link plate and the press lever 13 in hanging work.

In this embodiment, the guide member separation setter means employs a screw axis extending in the direction of the separation of the guide members. The present invention is not limited to this method. It will be apparent to those skilled in the art that an alternative method such as a link mechanism can adjust the separation between the guide members.

As described above, the embodiment 4 of the scallop hanger setting apparatus is provided with the guide member separation setter means capable of adjusting the separation between a pair of guide members. Regardless of their size, the scallops are firmly seated on the conveyer to be accurately positioned, and thus no displacement of the positioning is allowed.

The perforation accuracy in the scallop is thus enhanced, and the through-holes accurately aligned are obtained in the stacked scallops and the culturing rope P. The scallops are hung on the culturing rope P in a reliable manner.

The scallops are not likely to come off even if the speed of advance of the transport mechanism is increased. An enhanced efficiency in hanging work thus results.

Embodiment 5

Figure 30:
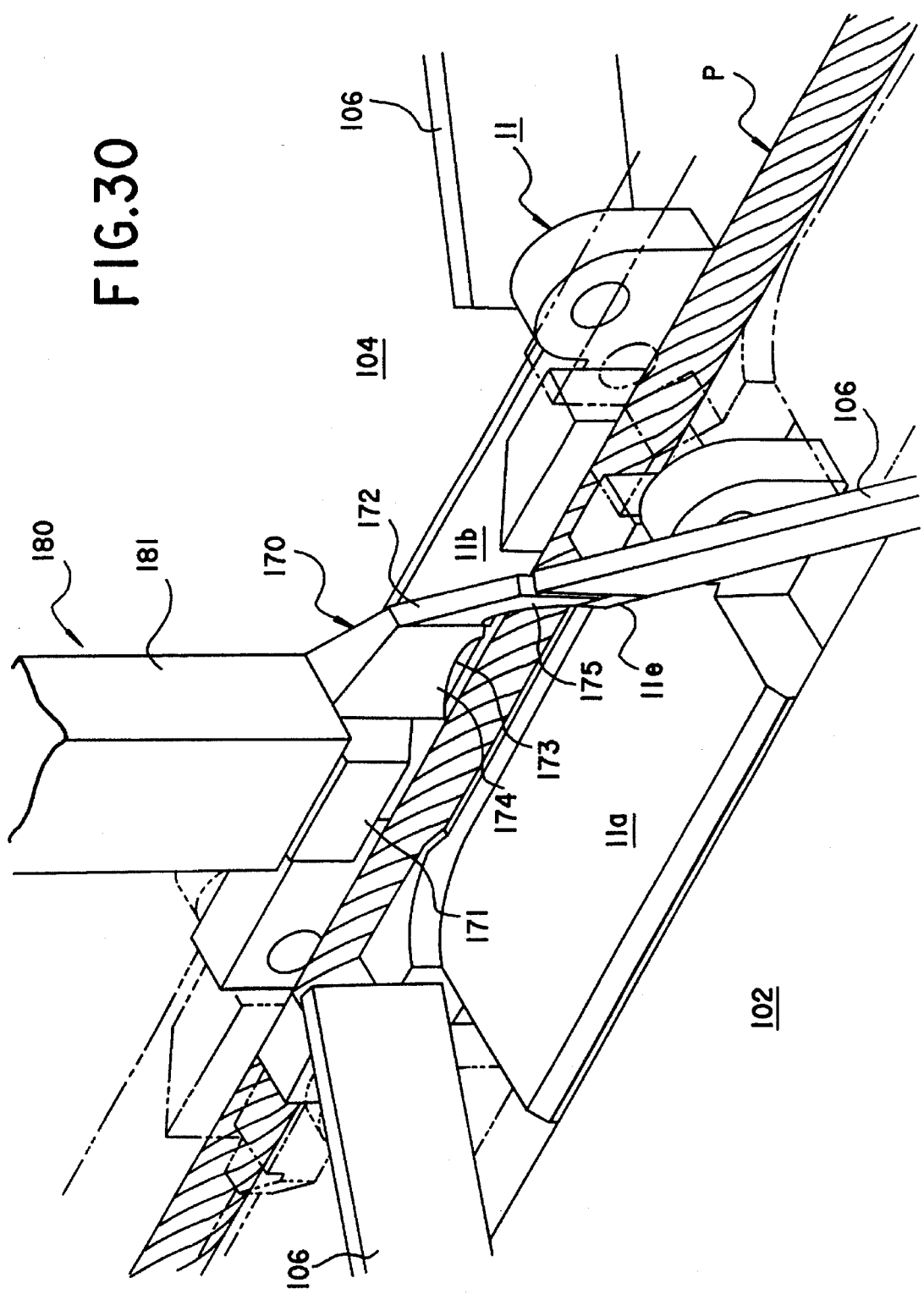
FIG. 30 is a perspective view showing the state in which a scallop is positioned by a second positioning member in an embodiment 4 of the scallop hanger setting apparatus according to the present invention.
Figure 35:
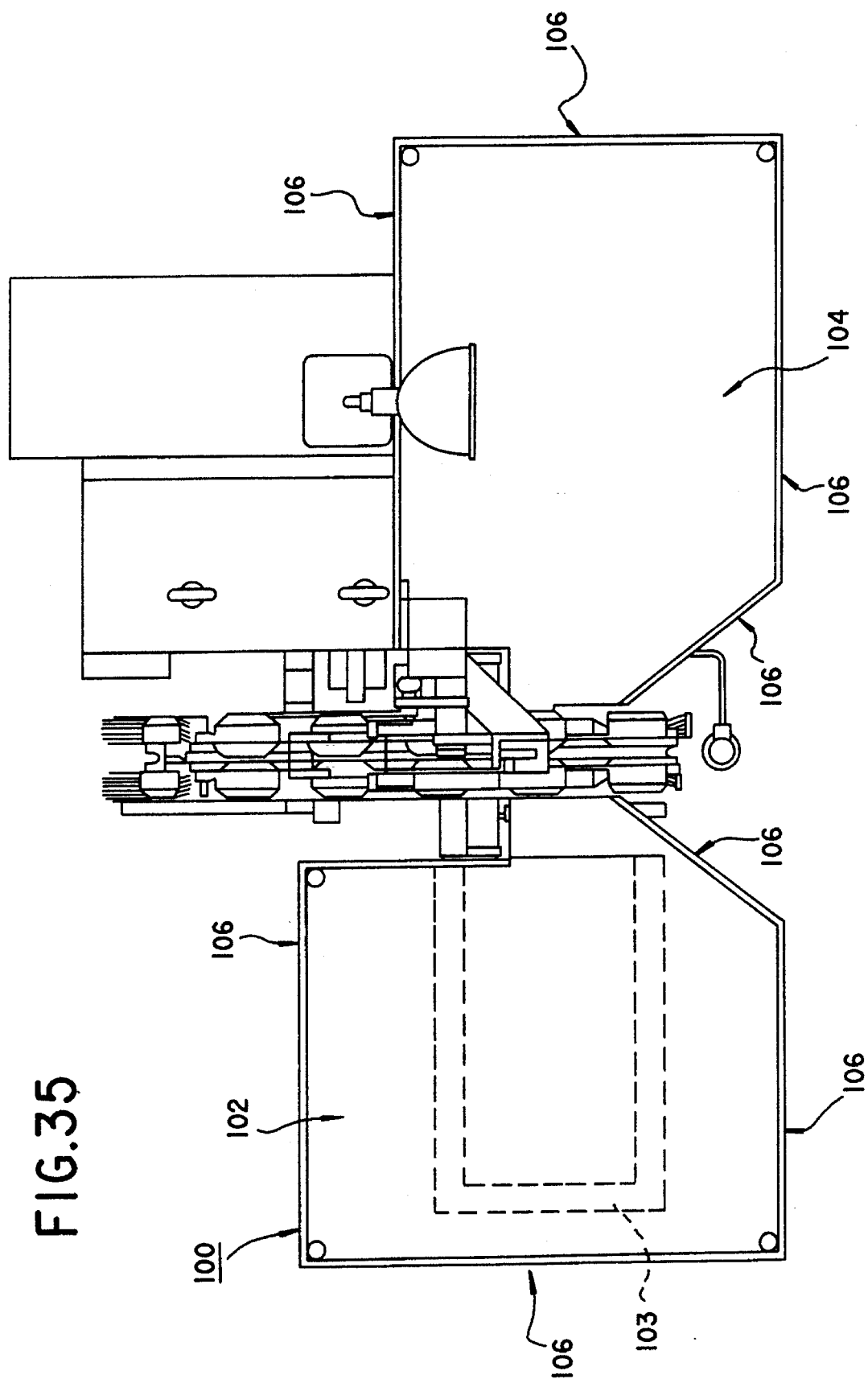
FIG. 35 is a plan view showing the state in which the scallops are placed onto a mounting table.

A fifth embodiment of the scallop hanger setting apparatus comprises, as shown in FIG. 30, a second positioning member 170, a raise/lower device 180 for raising or lowering the second positioning member 170 and, as shown in FIG. 35, a scallop mounting table 100, in addition to the first embodiment of the scallop hanger setting apparatus. The rest of the fifth embodiment remains unchanged from the first embodiment.

Discussed below are the features particular of this embodiment.

Figure 31:
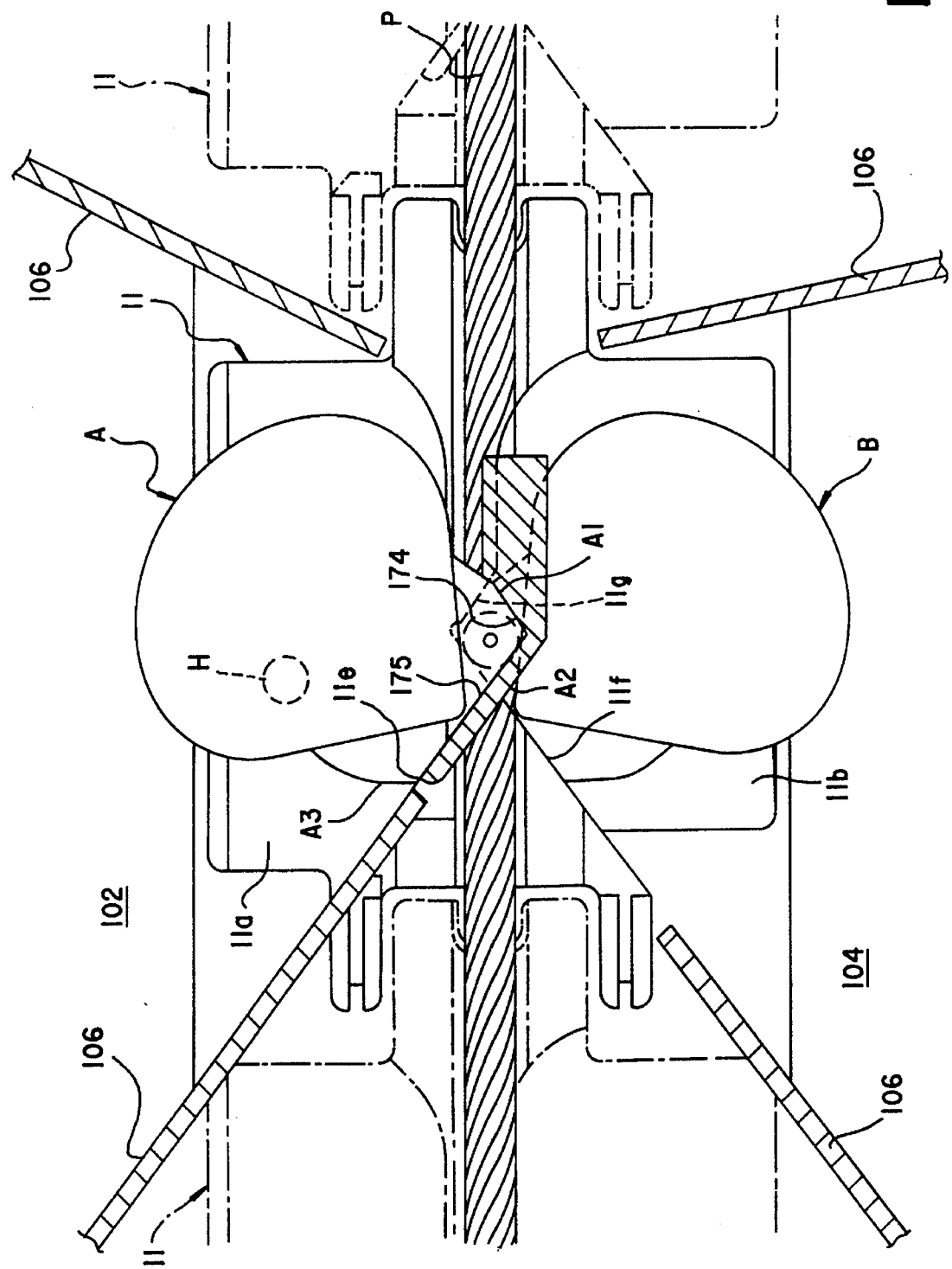
FIG. 31 is a plan view showing the state in which a scallop is positioned by a second positioning member in the embodiment 4 of the scallop hanger apparatus according to the present invention.
Figure 32:
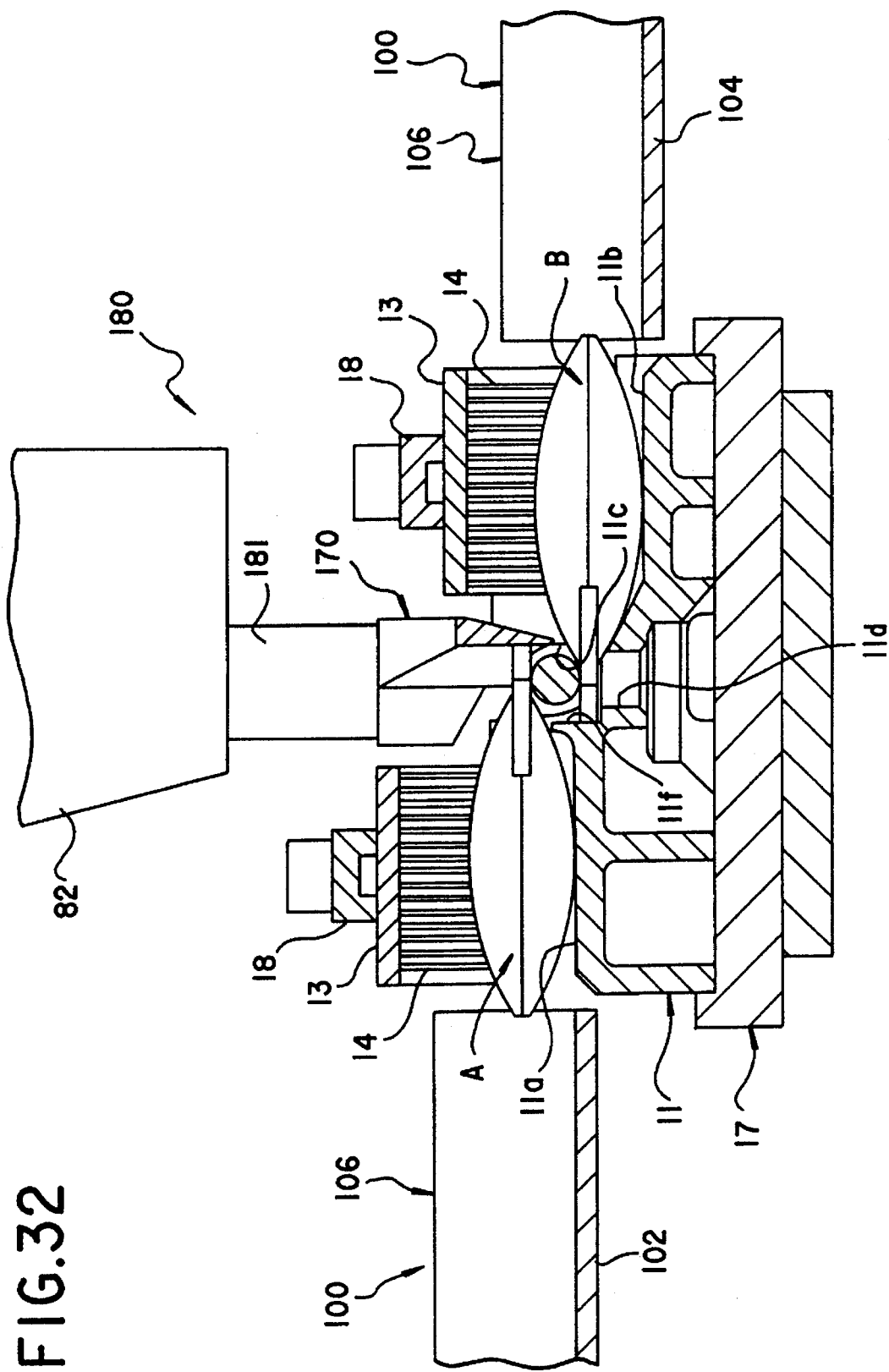
FIG. 32 is a front view showing the state in which a scallop is positioned by a second positioning member in the embodiment 4 of the scallop hanger setting apparatus according to the present invention.

As shown in FIG. 30 through FIG. 32, the second positioning member 170 is used to position a scallop A on the upside seating surface 11a of the link plate 11 in such a way that one side-flange of the scallop A comes on top a culturing rope P. The positioning member 170 comprises a base block 171 attached to the raise/lower rod 181 of the raise/lower device 180 and a positioning portion 172 extending horizontally and generally V-shaped when viewed from above. The inside surfaces 174, 175 of the positioning portion 172 abut the sides A1, A2 of one side-flange of the scallop. A recess 173 is disposed on the bottom portion of the base block 171 and the positioning portion 172 so that the culturing rope is not caught.

The pair of side-flanges of the scallop are not exactly symmetrical with respect to the center line of the scallop. The side-flange far from the heart H of the scallop has a larger area than the other side-flange as shown in FIG. 31. The angle made by the two sides A1 and A2 defining the side-flange far from the heart H is narrower than the angle made by two sides A2 and A3 defining the other side-flange that is nearer the scallop heart, and the corner angle of the side-flange far from the heart H is near 90 degrees.

The second positioning member 170 of this embodiment takes advantage of this nature of the scallops. The angle made by the inside surfaces 174 and 175 is set to about 110 degrees, the average angle between the two sides A1 and A2 that define the side-flange far from the heart of the scallop.

In the same manner as above, positioning portions 11f, 11g of a first portion member of the link plate 11 are used to position one side-flange of a scallop B below the culturing rope P. The positioning portions 11f, 11g also make an angle of 110 degrees, and abut two sides A1 and A2 defining said one side-flange of the scallop B that is far from its heart H.

As described above, in the fifth embodiment of the scallop hanger setting apparatus as shown in FIG. 31, both sides of the side-flange of the scallop A seated on the upside seating surface 11a of the link plate 11 abuts inside surfaces 174, 175 of the second positioning member 170, and both sides of the side-flanges of the scallop B seated on the downside seating surface 11a abut the positioning portions 11e, 11f. Both scallops A and B are positioned both in the direction of the culturing rope P and in the horizontally transverse direction of the link plate 11.

The above arrangement allows the perforating mechanism 4 to drill through-holes almost in the center of each side-flange of the scallops A and B, and prevents faulty drilling on the peripheral portion of the side-flange, which may possibly lead to a destruction of the side-flange.

Discussed next is the raise/lower device 180 for raising or lowering the second positioning member 170.

When scallops A and B are seated on a link plate 11 in this embodiment of the scallop hanger setting apparatus, the link plate 11 advances forward to allow the scallops A and B to face the perforating mechanism 4.

When the link plate 11 advances forward with the upside scallop A positioned by the second positioning member 170, the second positioning member 170 will interfere with the scallop A.

Therefore, the raise/lower device 180 according to this embodiment is designed to lift the second positioning member 170 while the link plate 11 advances.

Figure 33:
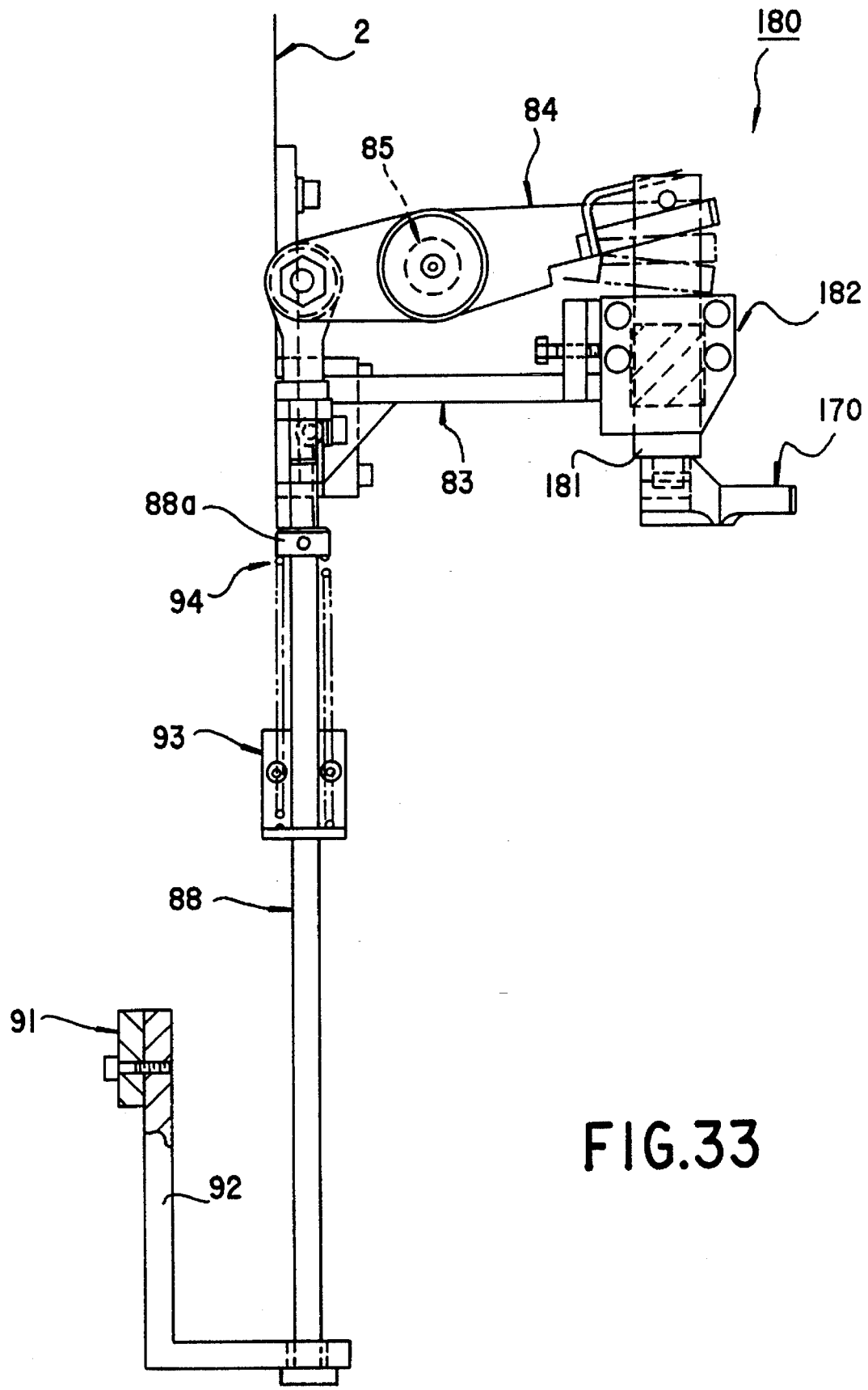
FIG. 33 is a front view showing the raise/lower device of FIG. 30.
Figure 34:
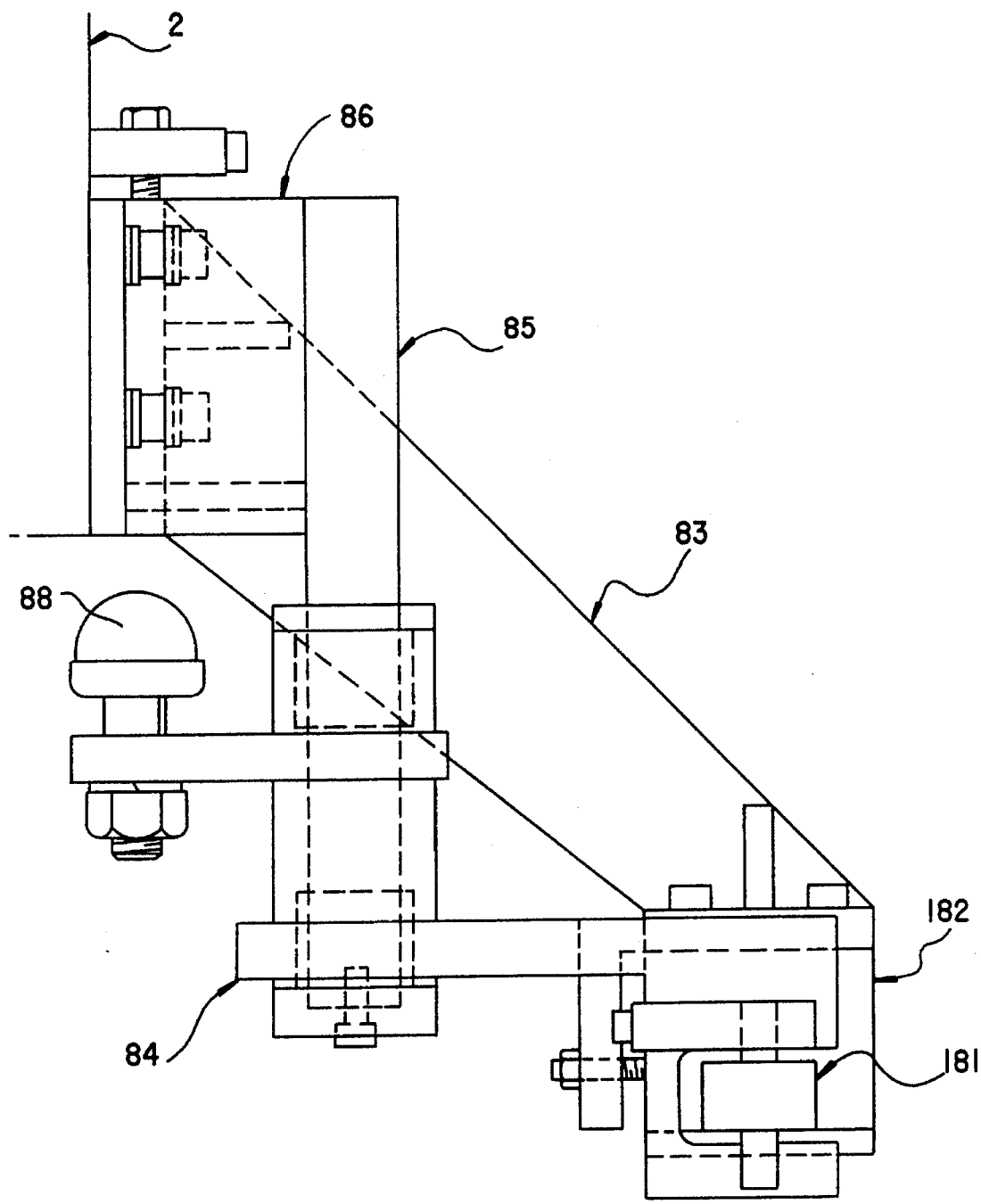
FIG. 34 is a plan view showing the raise/lower device of FIG. 33.

As shown in FIG. 33 and FIG. 34, the raise/lower device 180 comprises the raise/lower rod 181 having on its bottom portion the second positioning member 170 attached, a guide 182 vertically slidably supporting the raise/lower rod 181, a raise/lower lever 84 which is supported at its middle of the length by a horizontally extending support axis 85 in an oscillatorily movable fashion, and one end of which is connected to the top end of the raise/lower rod for raising and lowering the raise/lower rod 181, a downward running connecting rod 88 which is connected to the other end of the raise/lower lever 84 in an oscillatorily movable fashion, and a driving rod 91 which is connected to the bottom of the connecting rod 88 via a bracket 92, and which drives the connecting rod 88 downwardly in a stepwise manner.

The guide 182 and the support axis 85 are supported by stays 83, 86 bolted onto the mount 2.

The driving rod 91 is driven by the cam. That cam is rotated by the driving mechanism 8 which is also used to raise or lower the perforating mechanism 4, the threading mechanism 5 and the cutter mechanism 6.

A spring 94 is disposed between a bracket 93 bolted onto the mount 2 and a boss 88a formed on the connecting rod 88. The connecting rod 88 is continuously upwardly urged by the spring 94, keeping the second positioning member 170 closest to the link plate 11.

The operation of the raise/lower device 180 is now described. The conveyer 12 is moved by the pulleys 9, 10 and a link plate 11 stops at an insertion position where the scallops A and B are to be seated. The driving rod 91 is raised, causing the spring 94 to allow the connecting rod 88 to move upwardly.

The second positioning member 170 is lowered from its upper standby position, and reaches the closest position to the link plate 11. The positioning surface 175 and the positioning portion 11e of the link plate 11 are flush with each other.

When a predetermined time for seating the scallops A and B into the link plate 11 is elapsed, the driving rod 91 is lowered, drawing the connecting rod 88 downward, and raising the second positioning member 170.

Even if the link plates are moved in the forward transport direction, the second positioning member 170 will not interfere with the scallop A.

When a new link plate is brought into the insertion position for the scallops A and B, the driving rod 91 is raised, setting the second positioning member 170 closest to the link plate 11.

The second positioning member 170 is raised and lowered in synchronism with the stepwise motion of the link plate 11 in the forward transport direction.

Discussed next is the scallop mounting table 100.

Figure 36:
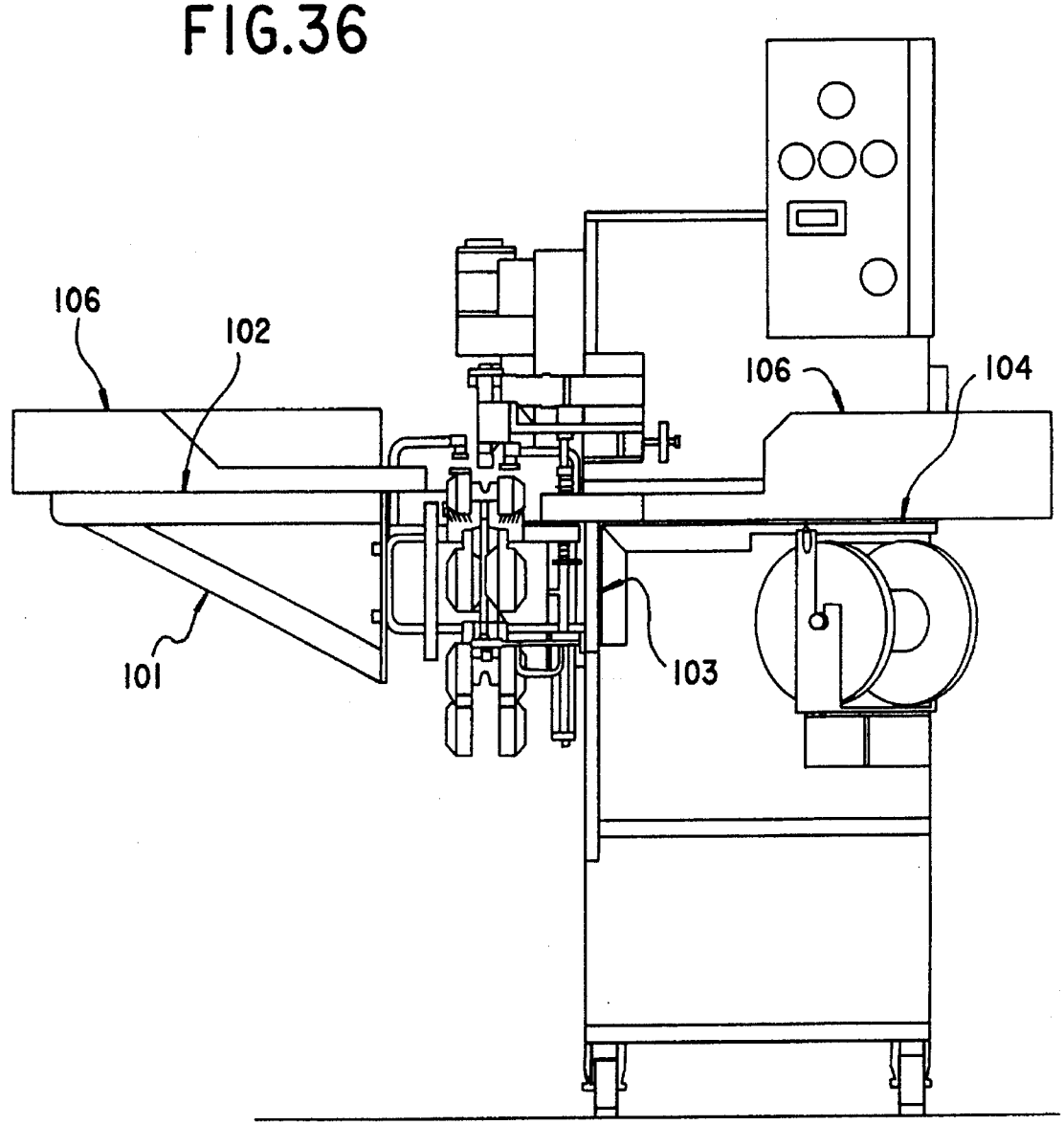
FIG. 36 is a front view showing the state in which the scallops are placed onto the mounting table.

As shown in FIG. 35 and FIG. 36, the scallop mounting table 100 comprises a pair of tabletop plates 102, 104 between which is disposed the conveyer 12 made up of the link plates 11 chained in an endless fashion, frames 101, 103 supporting the tabletop plates 102, 104, from below, which are bolted onto the mount 2, and upwardly projected rims 106 attached to the peripheries of the tabletop plates 102, 104 for preventing the scallops placed on the tabletop plates 102, 104 from falling off.

As shown in FIG. 32, the top surface of the tabletop plate 102 is flush with the upside scallop seating surface 11a of the link plate 11, and the top surface of the tabletop plate 104 is flush with downside scallop seating surface 11b of the link plate.

The portions of the rims 106 near the link plate 11 are constructed of, for example, resin or the like, so that they are easily deflected. When scallops are pressed against the rims 106, they shift to the positions as shown in FIG. 31, and they are guided toward the first positioning portions 11f, 11g and the second positioning member 170 of the link plate 11. When pressing the scallops against the rims 106, the rims 106 recover to their original positions so that they do not interfere with the stepwise forward movement of the link plates 11.

An operator for hanging operation first brings a great deal of scallops from a crate to the tabletop plates 102, 104. Then, the operator slides scallops over the tabletop plates 102, 104 to the link plate 11. Since the tabletop plates 102, 104 are respectively flush with the scallop seating surfaces 11a, 11b, and the rims 106 are designed to guide the scallops, the scallops can be successfully placed onto the seating surfaces 11a, 11b of the link plate 11 by simply sliding the scallops further.

According to the fifth embodiment of the scallop hanger setting apparatus, the scallops are easily and quickly placed onto the link plate by simply sliding the scallops which are brought on the mounting table 100 from the crate.

Scallop hanging work is thus easily and quickly performed. The scallop hanger setting apparatus achieves not only improved efficiency in scallop hanging work but also reduces physical workload imposed on the operator for hanging work.

Furthermore, according to the fifth embodiment of the scallop hanger setting apparatus, the scallop seated onto the upside seating surface 11a of the link plate 11 is positioned by the second positioning member 170, and the scallop seated onto the downside seating surface 11b of the link plate 11 is positioned by the positioning member of the link plate 11 as the second positioning means. The positioning of the scallops against the culturing rope P is assuredly performed.

Since the scallop is not perforated with its side-flange displaced from the culturing rope P, destruction of the side-flange, and thus, failure in hanging operation is unlikely to happen. An operator's job, such as hanging manually to the culturing rope P the scallop to which a hanging attempt once failed, may be eliminated. The efficiency of hanging work is enhanced even more.

As described above, the scallop hanger setting apparatus according to the present invention resolves a variety of problems associated with the conventional scallop hanger setting apparatus, and achieves an enhanced efficiency in hanging operation.

While the invention has been described in connection with specific preferred embodiments, those of ordinary skill will recognize that certain modifications can be made without deviating from the scope and spirit of the invention as defined in the following claims.

What is claimed is:

1. A scallop hanger setting apparatus comprising a wire member and a culturing rope, a wire member piercing the scallop's one side-flange and extending into the culturing rope to hang the scallop onto the culturing rope, whereby said wire member inserted into the culturing rope extends in a bar-like fashion.

2. The scallop hanger setting apparatus according to claim 1, wherein scallops with the culturing rope therebetween are pierced by said wire member with said rope sandwiched between the scallops by their side-flanges.

3. A method of hanging a scallop comprising the steps of:
   perforating a through-hole in the scallop's one side-flange that is farther to the scallop's heart than the scallop's other side-flange; and
   inserting a wire member into the through-hole to hang the scallop onto a culturing rope.

4. A scallop hanger setting apparatus comprising a wire member and a culturing rope, the wire member piercing a scallop's one side-flange and extending into the culturing rope to hang the scallop onto the culturing rope, whereby said scallop is positioned to the culturing rope by holding firmly the scallop's one side-flange onto the culturing rope.

5. The scallop hanger setting apparatus according to claim 4, wherein the scallop is positioned to the culturing rope by allowing the border of the scallop shell between its side-flange and its body to run roughly parallel to the culturing rope.

6. The scallop hanger setting apparatus according to claim 4, wherein the scallop is positioned to the culturing rope by firmly holding the scallop's one side-flange that is farther to the scallop's heart than the scallop's other side flange onto the culturing rope.

7. A scallop hanger setting apparatus comprising a wire member and a culturing rope, the wire member piercing a scallop's one side-flange and extending into the culturing rope to hang the scallop onto the culturing rope, whereby a pair of scallops are positioned to the culturing rope by arranging one scallop shell body on the left-hand side and the other scallop shell body on the right-hand side of the culturing rope when viewed from the axis of the through-hole in the culturing rope.

8. The scallop hanger setting apparatus according to claim 6, wherein positioning means for positioning a pair of scallops onto the culturing rope comprises a first seating surface for seating one of the left-hand and right-hand scallops and a second seating surface for seating the other of the left-hand and right-hand scallops, a step is disposed between the first seating surface and the second seating surface, the scallop seated on the first seating surface is positioned such that the scallop's one side-flange comes on top of the culturing rope, and the scallop seated on the second seating surface is positioned such that the scallop's one side-flange comes beneath the culturing rope.

9. A scallop hanger setting apparatus comprising a wire member piercing a scallop's one side-flange and extending into a culturing rope to hang the scallop onto the culturing rope, a first positioning member for positioning one side-flange of a first scallop to be placed on one side of the left-hand and right-hand sides of the rope, beneath the culturing rope so that the first positioning member abuts the first scallop's two sides defining the side-flange of the first scallop, and a second positioning member for positioning one side-flange of a second scallop to be placed on the other side of the left-hand and right-hand sides of the rope, on top of the culturing rope so that the second positioning member abuts the second scallop's two sides defining the side-flange of the second scallop.

10. The scallop hanger setting apparatus according to claim 9, wherein said first positioning member and said second positioning member are arranged so that the culturing rope is sandwiched between said second scallop's one side-flange from above and said first scallop's one side-flange from below.

11. The scallop hanger setting apparatus according to claim 10, wherein said first and second scallops are placed onto said first positioning member and then transported.

12. The scallop hanger setting apparatus according to claim 11, wherein said second positioning member can be raised or lowered relative to said first positioning member.

13. The scallop hanger setting apparatus according to claim 12, further comprising a scallop mounting table having a table surface running substantially flush with the seating surface of the first positioning member.

14. A method of hanging a scallop from a culturing rope comprising forming a through-hole in the scallop's one side flange, forming a through-hole in the culturing rope, positioning the scallop in such a manner that positioning members abut the scallop's two sides defining the scallop's one side-flange that is farther to the scallop's heart than the scallop's other side flange, and threading a wire member through the holes in said scallop flange and said culturing rope for hanging the scallop to the culturing rope.

15. A scallop hanger setting apparatus comprising a wire member piercing a scallop's one side-flange and extending into a culturing rope to hang the scallop onto the culturing rope, a perforating mechanism having a drill for perforating the scallops and the culturing rope to form through-holes, a cylindrical drill guide circumferentially covering the drill for guiding so that the drill is not radially deflected, and a threading mechanism for threading the wire member through the through-holes, whereby the drill guide starts holding the scallop's one side-flange onto the culturing rope before the drill starts perforating for the through-holes, and the drill guide is detached from the scallop's one side-flange after the threading mechanism completes the insertion of the wire member into the through-holes.

16. A scallop hanger setting apparatus comprising a wire member, and a culturing rope, the wire member piercing a scallop's one side-flange into the culturing rope to hang the scallop onto the culturing rope, whereby the axis of a guide hole in a guide member that guides the wire member toward through-holes in the scallop's one side-flange is offset from the axis of a drill that perforates the through-holes in the scallops and the culturing rope.

17. A scallop hanger setting apparatus comprising a wire member piercing a scallop's one side-flange and extending into a culturing rope to hang the scallop onto the culturing rope, a cutter mechanism for allowing the wire member to be inserted into a guide hole that extends toward the through-holes which are perforated in the scallop and the culturing rope using a drill and for cutting the wire member to a predetermined length, said cutter mechanism comprising a water feeder mechanism for feeding water into the guide hole and pushing water out of the opening of the guide hole open to the drill side, at least for the duration in which the drill operates.

18. The scallop hanger setting apparatus according to claim 17, wherein seawater is fed into the guide hole.

19. A scallop hanger setting apparatus comprising a wire member piercing a scallop's one side-flange and extending into a culturing rope to hang the scallop onto the culturing rope, a first plate on which a scallop is seated, a second plate which is rotatably supported by the first plate and which holds the scallop in cooperation with the first plate when the second plate comes close to the first plate in a rotary fashion, and a pair of guide members having therebetween the first plate and the second plate to set the second plate closer to the first plate, whereby said pair of guide members is provided with guide member separation setter means for adjusting the separation between the guide members.

* * * * *